United States Patent
Dotan-Cohen et al.

(10) Patent No.: US 11,973,734 B2
(45) Date of Patent: Apr. 30, 2024

(54) PROCESSING ELECTRONIC COMMUNICATIONS ACCORDING TO RECIPIENT POINTS OF VIEW

(71) Applicant: MICROSOFT TECHNOLOGY LICENSING, LLC, Redmond, WA (US)

(72) Inventors: Dikla Dotan-Cohen, Netanya (IL); Adar Vit, Hadera (IL); Tom Braude, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/356,107

(22) Filed: Jun. 23, 2021

(65) Prior Publication Data

US 2022/0417192 A1    Dec. 29, 2022

(51) Int. Cl.
*G06F 15/16*    (2006.01)
*G06F 18/214*    (2023.01)
(Continued)

(52) U.S. Cl.
CPC .......... *H04L 51/216* (2022.05); *G06F 18/214* (2023.01); *G06F 40/169* (2020.01); *G06F 40/30* (2020.01); *G06N 20/00* (2019.01)

(58) Field of Classification Search
CPC ..... H04L 51/216; G06F 40/169; G06F 40/30; G06K 9/6256; G06N 20/00
(Continued)

(56) References Cited

U.S. PATENT DOCUMENTS 7,774,832 B2 * 8/2010 Poling ................... H04L 63/102
                                                    709/224
8,374,651 B2 * 2/2013 Onda ................ H04M 1/72403
                                                    455/566
(Continued)

FOREIGN PATENT DOCUMENTS

EP    3654258 A1    5/2020

OTHER PUBLICATIONS

Garun, Natt, "How to enable and use Gmail's AI-powered Smart Reply and Smart Compose tools", Retrieved from: https://www.theverge.com/21315189/gmail-ai-smart-reply-compose-tools-enable-turn-on-how-to, Jul. 6, 2020, 6 Pages.
(Continued)

*Primary Examiner* — Thuong Nguyen
(74) *Attorney, Agent, or Firm* — Shook, Hardy & Bacon L.L.P.

(57) ABSTRACT

Technology is disclosed for controlling the processing of electronic communications on computing devices. An electronic communication is processed to determine mentions in the message body indicating recipients of the communication. A point-of-view (POV) is determined for each mention, with respect to recipient(s), as second-person or third-person POV. The communication is parsed into sections, and the mentions that are associated with each section are determined. Based on the POV for a mention associated with a section, it is determined that the section is directed to the recipient(s) indicated by the mention, if the POV of the mention is second-person POV, or the section is relevant to the recipient(s) indicated by the mention, if the POV of the mention is third-person POV. Additionally, an enhanced communication data is generated indicating the sections and corresponding POVs of mentions associated with the sec-
(Continued)

tions, and used to provide a personalized computing experience to users.

20 Claims, 18 Drawing Sheets

(51) Int. Cl.
*G06F 40/169* (2020.01)
*G06F 40/30* (2020.01)
*G06N 20/00* (2019.01)
*H04L 51/216* (2022.01)

(58) Field of Classification Search
USPC ............... 709/206, 203, 204, 224, 225, 229; 370/260, 392; 455/457, 466, 566
See application file for complete search history.

(56) References Cited

U.S. PATENT DOCUMENTS

| | | | |
|---|---|---|---|
| 9,497,153 | B2 | 11/2016 | Pellicer et al. |
| 10,547,574 | B2 | 1/2020 | Pham |
| 10,652,286 | B1* | 5/2020 | George ............... H04L 67/55 |
| 11,032,229 | B2* | 6/2021 | Nesbitt ............... H04L 51/214 |
| 11,165,731 | B1* | 11/2021 | Donohue ............. H04L 51/58 |
| 2005/0238156 | A1* | 10/2005 | Turner ............... H04L 51/043 709/204 |
| 2006/0075027 | A1* | 4/2006 | Zager ............... G06Q 10/107 709/206 |
| 2008/0043020 | A1* | 2/2008 | Snow ............... G01C 21/3635 345/427 |
| 2009/0076795 | A1 | 3/2009 | Bangalore et al. |
| 2009/0157714 | A1* | 6/2009 | Stanton ............... G06F 18/22 |
| 2010/0037152 | A1* | 2/2010 | Bates ............... G06F 3/04815 715/757 |
| 2013/0051772 | A1* | 2/2013 | Ramaswamy ......... G06Q 30/02 705/14.66 |
| 2014/0156827 | A1* | 6/2014 | Mankovskii .......... H04L 67/025 709/224 |
| 2014/0171129 | A1* | 6/2014 | Benzatti ............... H04L 67/535 455/457 |
| 2014/0188991 | A1* | 7/2014 | Dhara ............... H04L 67/306 709/204 |
| 2014/0280623 | A1 | 9/2014 | Duan et al. |
| 2015/0097767 | A1* | 4/2015 | Park ............... G06F 3/0304 345/156 |
| 2015/0215252 | A1* | 7/2015 | Rackliffe ............. H04L 51/212 709/206 |
| 2015/0355711 | A1* | 12/2015 | Rihn ............... G06F 3/04815 340/407.2 |
| 2016/0133230 | A1* | 5/2016 | Daniels ............... G06F 3/147 345/633 |
| 2016/0283577 | A1* | 9/2016 | Smith ............... G06Q 50/01 |
| 2019/0171693 | A1 | 6/2019 | Dotan-cohen et al. |
| 2020/0059447 | A1* | 2/2020 | Bahar ............... G06F 40/20 |
| 2020/0075013 | A1* | 3/2020 | Holm ............... H04M 1/72478 |
| 2020/0110750 | A1 | 4/2020 | Joseph et al. |
| 2020/0312331 | A1* | 10/2020 | Gustafson ............. G06F 3/011 |
| 2022/0219091 | A1* | 7/2022 | Kumah ............... A63F 13/60 |

OTHER PUBLICATIONS

"International Search Report and Written Opinion Issued in PCT Patent Application No. PCT/US22/031677", dated Sep. 12, 2022, 16 Pages.

* cited by examiner

EXAMPLE FOR JANE AS RECIPIENT

PROCESSING ELECTRONIC COMMUNICATIONS ACCORDING TO RECIPIENT POINTS OF VIEW

BACKGROUND

Electronic messaging is now widely used by many people to communicate, in both their business and personal settings. These messages are commonly sent to more than one recipient and often to a large group of recipients. In some cases, the content of a message (e.g., an email) is simply directed to all recipients, and in other cases, some content is directed to some recipients and other content to other recipients. In many instances, large email messages may include only a portion of content directed to a particular recipient, and much of the content may be only marginally relevant or irrelevant to the recipient. And in some instances, an entire message may be irrelevant to a particular recipient, but they are included because they are part of a distribution list or email group to which the message was sent, or perhaps they were important to include in an earlier email in a thread, but the conversation has changed and is no longer relevant to them. Without carefully reading an entire message, any particular recipient may not know whether portions of the message are relevant to them or not. This places a significant burden on the recipient-users to handle daily emails and chats, and this can make communication overwhelming. This burden is made worse when other recipients reply and these reply messages create additional messages that may be irrelevant or include only a portion of content relevant to the particular recipient. In addition to the extra time and effort this problem imposes, it can create confusion or misunderstandings, among the group of recipients, or cause particular recipients to miss important content that may be relevant to them, such as a task that they may be assigned in an email, lead them to reply unnecessarily or reply to everyone, or not respond at all.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technologies described in this disclosure are directed towards computerized systems and methods for providing improved electronic communications technology and enhanced computing services. At a high level and according to embodiments disclosed herein, electronic communication may be processed according to recipient points of view to provide improved electronic communication applications, generate enriched communications data, and improve computing experiences for users. For example, this can include improvements to the processing, transmission, storage, or presentation of electronic messages on personal computing devices (sometimes referred to herein as mobile devices or user devices), among other improvements.

By processing communications differently than conventional communication technology, embodiments of the disclosure improve computer technologies for electronic communications and provide enhanced computing services, as well as mitigate the aforementioned problems. In particular, according to one embodiment, an electronic communication (e.g., an email) for one or more recipients is received. The electronic communication can be processed to determine one or more mentions occurring in the message body, wherein each mention corresponds to (or indicates) at least one of the recipients of the electronic communication. Each mention then may be processed to determine a point of view (POV) for the particular mention. As each mention corresponds to a recipient, a POV for the mention may be determined to be a second-person POV ("POV2") or a third-person POV ("POV3").

The message body of the electronic communication may be parsed into one or more sections, and for each section, the mentions that are associated with that section may be determined, thereby forming a set of mentions associated with a particular section (sometimes referred to herein as section mentions). For each section, the section mentions associated with the section may be designated as intended recipients of the section. Based on the designated intended recipients of each section, an enhanced communication data may be generated comprising a data label for each section indicating the designated intended recipient(s) for the section and their corresponding POV(s).

Some embodiments further include using the generated enhanced communication data to provide visual indicators associated with sections of an electronic communication in order to indicate their relevance to a particular recipient; modify or summarize an electronic communication, such as by prioritizing or highlighting sections that are relevant to a particular user according to their POV, or removing, collapsing, or deprioritizing sections that are not relevant; generating a suggested reply communication that is based on the POV of a section with respect to the user sending the reply; enabling improved task management services; or generating labeled training data for machine-learning applications, among other improvements and enhanced computing experiences described herein.

BRIEF DESCRIPTION OF THE DRAWINGS

Aspects of the disclosure are described in detail below with reference to the attached drawing figures, wherein.

DETAILED DESCRIPTION

Figure 1:
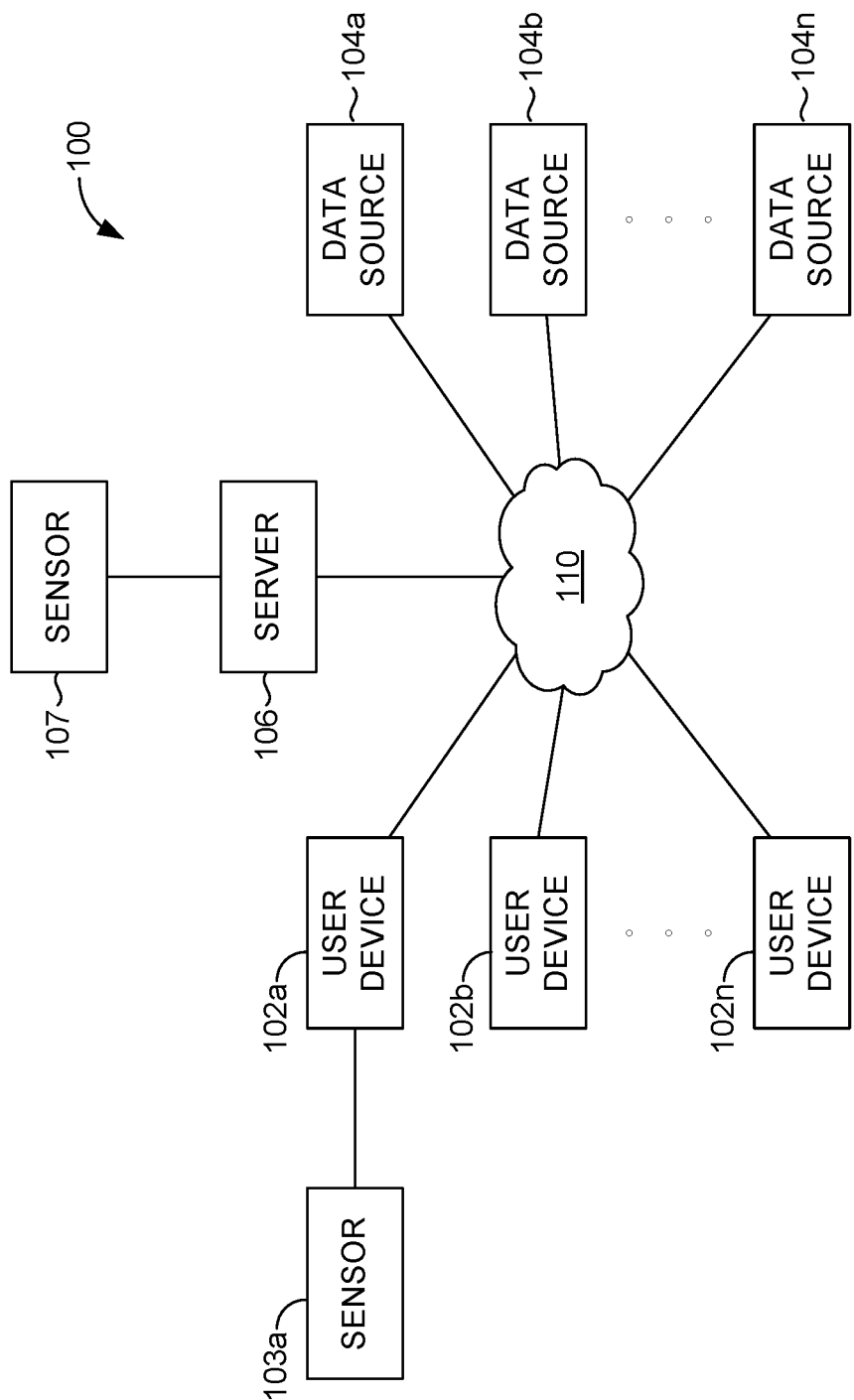
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Various aspects of the technology described herein are directed towards systems, methods, and computer storage media for, among other things, improved computer technology for electronic communications and enhanced computing services. In particular, electronic communication for one or more recipients may be processed according to the points of view for recipients that are associated with portions of the electronic communication. For example, an email (or other electronic communication) may be processed so that portions of the email that are directed to a particular recipient are identified for the recipient, such as via a visual indicator. In some implementations, an indication of whether a portion of the email is directed to the recipient or merely relevant to the recipient—each of which may be determined based on a POV determined for the recipient with respect to the message portion, as described herein—also may be determined and/or indicated via a visual marker. Thus by processing communications to be received differently than conventional communications technology, embodiments of this disclosure enable the provision of new functionality for electronic communications computing applications, as well as improved efficiency for electronic communication, enriched electronic communications, and improved computing experiences for users, such as personalized computing experiences and improved user accessibility, among other improvements described herein.

Accordingly, at a high level, an electronic communication, sent (or to be sent) to one or more recipients, is received. Examples of the electronic communication may include, without limitation, email, chat, text message, a meeting transcript, or a chat session transcript, and may comprise just one message or a plurality of messages. The electronic communication may comprise a message body (or multiple messages or message bodies) and metadata indicating one or more recipients, such as email addresses, distribution lists, or group-address names in the TO or CC fields, or a list of chat session participants or meeting attendees, or other information related to the communication that may be used to determine the recipients. For example an electronic communication that is an email may comprise a message body that is the textual body of the email message and metadata indicating information about to whom the email is sent (for example, recipients in the TO and CC fields), the sender, email subject line, whether the email is a reply or forward, or other information related to the email. The electronic communication may be received at a client computing device or a server, for example.

In some instances, the message body of an electronic communication may be determined to have one or more portions or sections (for example, paragraphs, sentences, or portions of the message body). For example, an email may have a salutation, two paragraphs, and a closing, which may be determined to comprise 4 sections, according to an embodiment of this disclosure. Additionally, in some instances various sections of an electronic communication may be intended, by the sender (or author) of the electronic communication, for some but not necessarily all of the recipients. For example, one section of a message sent to multiple recipients may directly address only one of the recipients, such as "Tom, please send me the file." Thus, Tom may be considered an intended recipient of this section of the message. Accordingly, an intended recipient of a section of an electronic communication is a recipient for which the section is relevant, which may further comprise a recipient for which the author of the communication (e.g., the sender of an email) intends the section to be for. Moreover, in some instances a section may be considered to be directed to a particular intended recipient or merely relevant to a particular intended recipient. For example and as further described herein, a message section comprising "Tom, send the file to Paola" may be determined to have Tom and Paola as intended recipients of the section, and be determined further to be directed to Tom and relevant (but not directed to) Paola.

The electronic communication may be processed to determine the one or more recipients of the electronic communication. A recipient comprises at least one user who receives an electronic communication, or to whom an electronic communication is sent. In some embodiments, the term recipient may refer to a plurality of users who receive an electronic communication, or to whom an electronic communication is sent. As described previously, an electronic communication, such as an email message that is sent to multiple recipients, may have a specific section of the message body that is intended for some but not necessarily all of the recipients. The intended recipients for that section may be determined from the one or more recipients of the electronic communication, as further described herein. By way of example, if an email has a TO field that specifies "distribution_list1; Tom@example.com; Paola@example.com;" and a CC field that specifies "distribution_list2; Jane@example.com" then the recipients of the email would be Tom, Paola, Jane, and the specific users who are members of the distribution_list1 and distribution_list2 email distribution lists. Further, as the intended recipients for a particular section may be determined from the recipients of the electronic communication, then continuing this example, the intended recipients for one particular section of this example email may be determined as Tom and Paola. In some embodiments as further described herein, a recipient of an electronic communication, or an intended recipient for a section, may be determined or identified using a user identification, user account name, email address, last name, first and last name, or other user/recipient identifier.

In some embodiments, the electronic communication may be processed further to determine the one or more candidate section recipients for at least one section of the message body. A candidate section recipient is a recipient of the electronic communication for which a particular section or portion of the message body may be potentially intended. For instance and as described previously, an electronic communication, such as an email message that is sent to multiple recipients, may have a specific section of the message body that is intended for some but not necessarily all of the recipients. In some embodiments, the intended recipients for that specific section of the message body may be determined from among the candidate section recipients for that section.

The electronic communication can be processed to detect one or more mentions in the message body, where each mention corresponds to (or indicates) at least one of the recipients of the electronic communication. Accordingly, as used herein, a mention represents an indication or reference in the message body to at least one recipient of the electronic communication. In some embodiments, a recipient of an electronic communication, or a candidate section recipient of a particular section, may be used to determine a recipient identity indicated by (or associated with) a mention. According to a simplified example, suppose an electronic communication has recipients determined as Tom Jones, Paola Smith, and Jane Garcia, and includes one section in the message body, "Tom, send the file to Paola." Then according to this example, Tom Jones and Paola Smith may be determined as mentions in the message body. In particular, it may be determined, as described herein, that "Tom" here likely refers to Tom Jones, and "Paola" here likely refers to Paola Smith, and neither "Tom" nor "Paola" likely refers to Jane Garcia. In some embodiments, an entity extraction model or entity extraction logic may be used to determine a mention in the message body, as described herein.

In some embodiments, only mentions that correspond to a particular recipient, which may include mentions to a group, such as a distribution list, to which the recipient is a member, are determined. For example, some embodiments may operate on (or partially operate on) a user computing device (for example, a user device) associated with a particular user, or may operate on (or partially operate on) a server in connection to an account associated with the particular user. For instance, this may include an email account, a chat or messaging account, a communications account, or a similar user account. In some of these embodiments, only mentions that correspond to that particular user, as a recipient, are determined. Thus, for instance, an email received by a particular user, although part of a group of recipients, would be processed to determine the mentions in the email message body that correspond to that particular recipient.

Each mention (or at least one mention) in the message body may be used to determine a point of view (POV) for the particular mention. As each mention indicates or corresponds to a recipient, a POV for the mention may be determined to be a second-person POV (POV2) or a third-person POV (POV3). Continuing the earlier example of "Tom, send the file to Paola," where Tom Jones and Paola Smith are determined as mentions, the particular mention of Tom may be determined as having a second-person POV (POV2), because the sentence is directed to Tom. The particular mention of Paola may be determined as having a third-person POV (POV3), because the sentence is not directed to Paola, but it is relevant to her. The sender (or author) of the electronic communication may be considered as having a first-person perspective. Thus, the sender (or author) may be considered a first party to the sentence, Tom may be considered a second party to the sentence because the sentence is directed to Tom, and Paola may be considered a third-party to the sentence because the sentence is not directed to her, but is relevant to her because she is mentioned. Further, where a particular recipient corresponds to two or more mentions in the message body, the POV determined for each mention may be different. That is, a first mention for Tom may be a POV2, but a later mention for Tom may be determined to have a POV3. For instance, continuing the above example, if a sentence occurring later in the message body is "Paola, please send Tom's file to me, after you add the analysis," then this second mention of Tom may be determined as having a POV3, and this second mention for Paola may be determined as having a POV2. Some embodiments further may determine the "you," referring to Paola in this sentence, also to be a mention. In these embodiments, this mention to Paola also may be determined as a POV2 because the portion "after you add the analysis" is also directed to Paola.

In some embodiments, POV determination logic 235, or a POV model may be utilized to determine the POV of a mention, as described herein. Some of these embodiments that utilize POV determination logic or a POV model further use one or more features associated with or characterizing the mention to determine a POV for the mention, which are referred to herein as mention features. Mention features may be determined or extracted from the electronic communication or related information, such as communication-related data. Thus, some embodiments include performing a feature extraction or feature determination operation for aspects of the electronic communication associated with the mention.

For instance, in some embodiments, aspects of the message body may be analyzed to determine or extract a set of mention features for the mention. By way of example and not limitation, these aspects of the message body may comprise: one or more words occurring in the message body in proximity to the mention, for example: n-grams or n-words, such as three words, occurring before and/or after the mention, the words occurring in the same sentence or the same paragraph as the mention, or the presence of specific types such as conjunctions, and/or information about parts of speech of these one or more words, for example: noun, verb, adjective, or other parts of speech; punctuation and/or indentation occurring in the same sentence or paragraph of (or in proximity to) the mention in the message body; a location of the mention within a sentence and/or paragraph of the message body (for example, at the beginning or end of a sentence), and/or the mention's location within the message body; or other aspects of the message body or more generally, the electronic communication.

The message body of the electronic communication may be parsed into one or more sections. A section may comprise at least a portion of the message body. A section may be potentially directed to or relevant to at least one of the recipients of the electronic communication. For each section (or at least one section), the mentions that are associated with that section may be determined, thereby forming a set of mentions associated with the particular section. The set of mentions for a particular section may be referred to herein as the "section mentions" for the particular section. For each section, any section mentions associated with the section may be designated as intended recipients of the section. In some embodiments, a section mention associated with the section may be designated as an intended recipient based on the POV corresponding to the section mention. For example, in some implementations, only section mentions determined to have a second-person POV (POV2) or determined to have a third-person POV (POV3) are designated as the intended recipients of the section. Alternatively or in addition, some embodiments may use the POV corresponding to a section mention to designate the section mention as either a POV2 intended recipient, if the POV corresponding to the section mention is determined as POV2, or a POV3 intended recipient, if the POV corresponding to the section mention is determined as POV3.

Based on the designated intended recipients of each section of the message body, an enhanced communication data may be generated comprising a data label for each section indicating the designated intended recipient(s) for the section and their corresponding POV(s). In some embodiments, this enhanced communication data may be used to determine visual indicators associated with sections of an electronic communication that indicate their relevance to a particular recipient. In some implementations, a visual indicator of the corresponding POV for each section with respect to one or more of the intended recipients also may be determined, based the section's corresponding data label. The visual indicators may be presented via an electronic communications computing application, which may be operating on or in connection with a user device of the particular recipient. For instance, a user may be presented with an enhanced version of an email that indicates (e.g., via a highlight, color, shading, marking or label, or similar visual indicator) which sections of the email are directed to her as a second-person POV and which sections are relevant to her as a third-person POV. Several example embodiments of visual indicators presented via an electronic communications computing application are described in connection with FIGS. 3C and 3F.

Some embodiments can include programmatically modifying or generating a summary of an electronic communication to include, or to prioritize, sections of the communication that are intended for a particular recipient (for example, that are determined to be directed to or relevant to the recipient). The modification or summary may be based on the POV corresponding to a mention of the particular recipient in a section. For example, in some embodiments, a section may be considered directed to the intended recipient if the POV for a recipient's mention associated with the section is POV2, and the section may be considered relevant to the intended recipient if the POV for the recipient's mention associated with the section is POV3. Similarly, when modifying or generating the summary, sections that are determined not to be relevant to the particular intended recipient may be omitted, collapsed, or deprioritized. Several example embodiments of these summaries are described in connection with FIGS. 3E and 3H.

Some embodiments can provide improved user-accessibility technology by programmatically identifying and surfacing portions of a communication that are directed to (or relevant to) a user. For instance, some embodiments can enable visually impaired users that rely on computer-assisted reading of emails to have those portions of the email that are directed to or relevant to the user prioritized for presentation. For example, these portions may be prioritized by being read by the computer first, by enlarging, highlighting, or otherwise making those portions more apparent to the user. Thus, for example, instead of computer-assisted reading of an entire communication, only portions intended for the user are read, thereby improving computing resource consumption as well as the user's computing experience.

Some embodiments use the enhanced communication data or data labels to generate a suggested reply (that is a second electronic communication replying to the electronic communication) for a particular recipient. The suggested reply may be programmatically generated based on whether a section being addressed in the reply is POV2 or POV3 with respect to the recipient. Thus, in some embodiments, the suggested reply will be different if the particular recipient for the section is POV2 vs. POV3. For example, if a section of the message is "Tom, please send the file to Jane," then a suggested reply for Tom, as POV2, may be "Sure, I will send it," and a suggested reply for Jane, as POV3, may be "Looking forward to getting the file from Tom." Several example embodiments of generating suggested replies are described in connection with FIGS. 3D and 3G.

Some embodiments use the enhanced communication data or data labels to provide improved task tracking and reminders management computing services, which may include commitments, reminders, tasks, responses, or similar activity to be monitored for a user. In particular, by programmatically determining that a user is an intended recipient of a portion of a communication according to the user's POV, and providing this data to a task handling computing service, the service can better distinguish and more accurately process incidents where the user is responsible for carrying out a task associated with the portion of the communication vs. incidents where a task that is associated with the portion of the communication is merely relevant to the user. For instance, continuing the above example with the text "Tom, please send the file to Jane," by determining that Tom is POV2, and Jane is POV3, then it can be determined that Tom is responsible for the task associated with this statement (for example, sending the file to Jane), whereas the task is merely relevant to Jane (for example, she will receive the file from Tom). Accordingly, the task handling computing service tracks and processes the task as being assigned to Tom and not Jane. One example embodiment showing aspects of a graphical user interface for an improved task management computing service is described in connection with FIG. 3J. Similarly, providing this data indicating that a portion of a communication is according to the user's POV may be used to track commitments made by the sender of the communication to specific recipients, such as in "Tom, I will send you the file tomorrow," where it can be determined that this portion of the message is directed to Tom, as POV2, and a commitment, which is like a self-assigned task, by the sender, is made to Tom.

Some embodiments use the data labels (or the mentions with corresponding POVs) to generate labeled training data for machine-learning applications. By way of example and without limitation, one such example application is email spam filtering. Spam filtering technologies may utilize machine-learning and may be trained to more accurately distinguish legitimate email messages from unsolicited email or spam. Labeled training data that includes aspects of the data labels or the mentions with corresponding POVs, that are determined by embodiments of the technologies disclosed herein, may be used to characterize legitimate email from illegitimate spam, and thus provide valuable feature distinction in spam classification. In this way, some embodiments of the disclosure improve email filtering technologies.

Some embodiments can present a visual indication, associated with the electronic communication identified in the particular recipient's inbox of an electronic communication application (e.g., an email application), indicating that the communication is determined to have sections directed to the recipient or relevant to the recipient. In this way, the electronic communications application can be used to prioritize, filter, highlight, or further process the recipient's incoming messages based on each message's relevance to the recipient as an intended recipient of portions of the message. For example, a user may filter her email inbox to present only email messages that are determined to have content (e.g., at least one section) that is directed to her (or either directed to her or relevant to her). These and other examples of enhanced computing experiences are made possible by embodiments of the technologies described herein.

Overview of Technical Problems, Technical Solutions, and Technological Improvements The coalescence of telecommunications and personal computing technologies in the modern era has enabled, for the first time in human history, near-instantaneous communication with a ubiquity of personal computing resources (including mobile personal computing devices and cloud-computing coupled with communication networks). As a result, it is increasingly common for users to rely on one or more mobile computing devices throughout the day for communication-based tasks. But the electronic messages, such as emails, may become dauntingly voluminous, disorganized, and difficult to fully understand. Moreover, the conventional technologies for organizing and displaying electronic messaging continue to suffer from the deficiencies described above, including problems created from multi-party messages described herein. The progression of telecommunications and personal computing technologies has elevated time-based pressures on users to respond or act on incoming electronic messages, but have so far not provided a mechanism to accurately determine portions of a message that are directed to a user (as a recipient), portions of the message that are merely relevant to the user, and portions of the message that are irrelevant to the user, nor have conventional technologies provided other enhanced services made possible by processing messages according to recipient points of view for recipients associated with portions of the electronic communications. (This is particularly so for mobile devices, which often have limited screen real estate for displaying user interfaces for electronic messaging applications.)

Moreover, conventional technologies for handling electronic messages based on recipients suffer from a number of technical deficiencies. First among these technical shortcomings, conventional approaches are capable only of matching explicit names of recipients in a section of a message body, or will always determine that a portion of a message is directed to a person whenever the explicit name of the person appears in the portion of text, regardless of the context or point of view. For example, if a portion of a message does not include an explicit name of a recipient, then the conventional technologies are unable to determine that the message portion is intended for a particular recipient. Similarly, if the portion of the message does include an explicit name of a recipient, but the POV of that explicit name is as a third-person point of view (POV3)—and thus the portion of the message may be relevant to that recipient but not directed to that recipient—the conventional technologies can only determine (erroneously) that the portion is directed to the recipient. In contrast, some embodiments of the technologies described herein solve these deficiencies by identifying all (or multiple) sections of a message that are relevant to a particular recipient, even where their name does not appear in the section or does not explicitly appear (as it might appear in the message metadata, such as the TO or CC field, or in an email distribution list). Further, some embodiments can determine sections that are directed to a particular recipient, merely relevant to the recipient, and/or may be irrelevant to the recipient.

Another technical deficiency is that conventional approaches to processing multiparty messages attempt to determine relevance of a portion of the message on a per-portion (or per-section) basis. For example, an initial pool of recipients of the message may be identified and used each time, as a default, for determining relevance for a portion of the message, unless there is an explicit occurrence of a recipient in the portion, in which case the portion is always attributed to that recipient. But this approach leads to the same problems described in the previous paragraphs.

Yet another approach, which is technically deficient for reasons similar to those described previously, considers only exhortations and vocative expressions in a portion of text for determining that the portion is for a particular recipient. A vocative indicates a party being addressed in a statement. For example, in the sentence, "Could you please bring me the report, Tom," Tom is a vocative. In this regard, the person of the vocative has a second-person POV, because the statement is directed to that person (for example, Tom). Similarly, an exhortation to a recipient, such as "Tom, bring me the report," also would be considered a second-person POV, because the statement is also directed to that person (for example, Tom). But if instead the portion of text were, "Bring me the report when you get it from Jane, Tom," then approaches considering exhortations and vocatives would fail because they would either consider the reference to Jane as a vocative or exhortation (it is neither) and classify the sentence as being directed to Jane (it is not). Or these approaches would simply fail to determine that the statement is relevant to Jane although not directed to Jane, since Jane is neither a vocative nor exhortation.

Still further, conventional technologies lack the functionality to discriminate between recipient references or mentions in a portion of the message text that are POV2 vs. POV3. Consequently, many of the enhanced computing services described herein are not possible or would not operate properly according to the conventional technologies. For instance, consider the earlier example where a portion of a message does include an explicit name of a recipient, but the POV of that explicit name is as a third-person (POV3). Because the conventional technology incorrectly determines that the message is directed to that recipient, a task management service that receives this information will incorrectly assign the recipient as being responsible for the task. (E.g., for the sentence, "send me the file from Jane," Jane is not responsible for carrying out this task.) Similarly, other enhanced computing services such as those that highlight or summarize portions of a message that are directed to a particular user also will either be inoperable or prone to error with the conventional technology.

Accordingly, by processing communications to be received by multiple parties differently than conventional communication technology, as well as performing other operations described herein, embodiments of the disclosure improve computer technologies for electronic communications and enhanced computing services, as well as mitigate the aforementioned problems. Identifying the proper person (or people) to whom a section in a message is directed is a valuable part of providing a good user computing experience and efficient communications, as well as enabling enhanced and personalized computing services to be provided to users. Embodiments of this disclosure further enable an improved user experience across a number of computer devices, applications and platforms. For example, some embodiments described herein facilitate identifying particular information items in communication that are relevant to a user based on the user's point of view, and presenting this to the user for a more efficient user session, thereby improving user productivity and reducing computer resource consumption. Further, in some embodiments, solutions provided herein include technologies for improving or providing improved control over the presentation or display of electronic communications on computing devices, and/or user responses to these electronic communications. Further still, in some embodiments, the solutions provided herein present or highlight an electronic communication, a summary of a message, or a portion(s) of messages that are determined to be relevant to a user based on a point of view corresponding to user mentions in the message(s).

In this way, some embodiments described herein enable a very large scale of operations created by software-based services that cannot be managed by humans to operate in an efficient manner while determining and providing users with a personalized computing experiences. Also, in this way, some embodiments described herein cause aspects of electronic communications to be programmatically surfaced or indicated and/or presented, or enable programmatically generated suggested replies that are that are specific to a user-perspective in particular communication, without requiring computer tools and resources for a user to manually perform operations to produce this outcome. Still further, in this way, some embodiments described herein reduce or eliminate a need for certain databases, data storage, and computer controls for enabling manually performed steps by an administrator, to identify, access and configure (e.g., by hard-coding) portions of a communication relevant to a user, based on a point of view, in order to provide any of the enhanced computing experiences described herein.

Additional Description of the Embodiments

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) communications data or user data, which may include user-activity related data, to communication-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to communication-data collection component 210 of FIG. 2.

Figure 2:
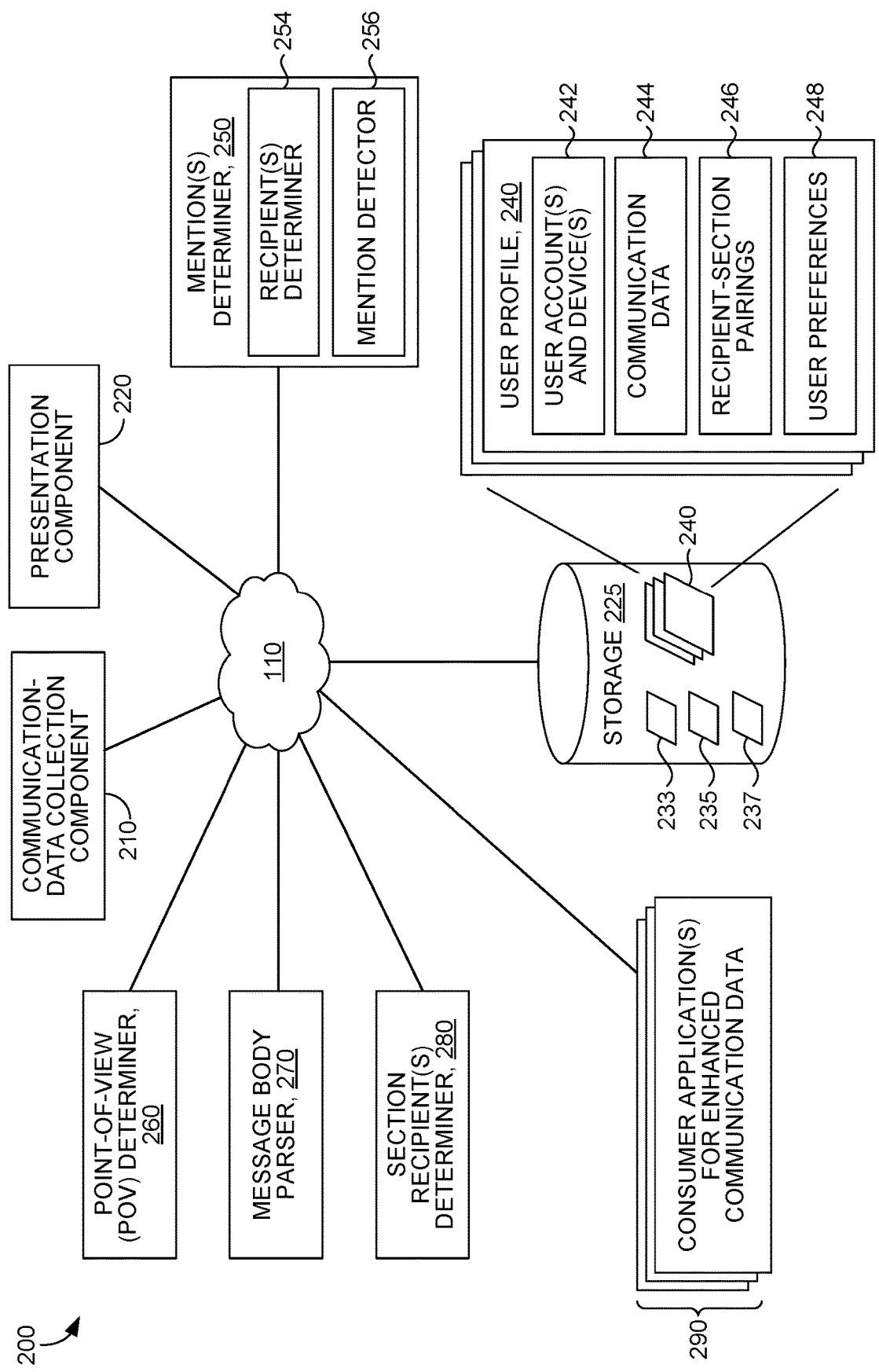
FIG. 2 is a diagram depicting an example computing architecture suitable for implementing aspects of the present disclosure.

Operating environment 100 can be utilized to implement one or more of the components of system 200, described in FIG. 2, including components for collecting communication data; determining mentions, determining POVs, parsing message bodies, determining section recipient(s), enhanced communication data consumer(s), and/or the presentation or display of content to users. Operating environment 100 also can be utilized for implementing aspects of methods 400 and 500 in FIGS. 4 and 5.

Referring now to FIG. 2, with FIG. 1, a block diagram is provided showing aspects of an example computing system architecture suitable for implementing an embodiment of this disclosure and designated generally as system 200. System 200 represents only one example of suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including communication-data collection component 210, presentation component 220, mentions determiner 250, point-of-view (POV) determiner 260 ("POV determiner 260"), message body parser 270, section recipient(s) determiner 280, one or more consumer application(s) 290 for enhanced communication data, and storage 225. Mentions determiner 250 (including its subcomponents 254 and 356), POV determiner 260, message body parser 270, section recipient(s) determiner 280, consumer application(s) 290 for enhanced communication data, communication-data collection component 210, and presentation component 220, may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more computer communications-related applications, services, or routines (such as an email application, online meeting application, or task handling service). In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, communication-data collection component 210 is generally responsible for accessing or receiving (and in some cases also identifying) communications-related data (which may comprise user data) from one or more data sources, such as data sources 104a and 104b through 104n of FIG. 1. In some embodiments, communication-data collection component 210 may be employed to facilitate the accumulation of user-related or communication-related data of a particular user (or in some cases, a plurality of users including crowdsourced data) for various other components and subcomponents of system 200. The data may be received (or accessed), and optionally accumulated, reformatted, and/or combined, by communication-data collection component 210 and stored in one or more data stores such as storage 225, where it may be available to other components of system 200. For example, the communication-related data may be stored in or associated with a user profile 240, as described herein. In certain embodiments where identifying user data is processed, any personally identifying data (for example, user data that specifically identifies particular users) is either not uploaded or otherwise provided from the one or more data sources with user data, is not permanently stored, and/or is not made available to other components of system 200.

Communication-related data may be received from a variety of sources where the data may be available in a variety of formats. For example, in some embodiments, communication-related data received via communication-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, the communication-related data (which may include user data) may include electronic communication data such as data regarding email; electronic chat; instant message; online meeting chat or messaging; SMS text messages or messages from messing apps; audio or video data, which may include recordings or transcription; meeting data, which may include audio, video, elated meeting content, recording, or transcription; call or voicemail data which may include recording or transcription; video conference and video calling data; social media communication including posts, messages, chats, or other content shared to users; in app communications such as occurring between users within games or virtual realities; or other data that may be used for processing communications as described herein. For example and without limitation, in some embodiments, communication-related data or user data received by communication-data collection component 210 for use by a component of system 200, may further include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; various user-communications-related activity data including calls and call-transcriptions, texts, instant messages, and emails; website posts; other user data associated with communication events such as meeting transcriptions; etc.) including, in some embodiments, communication-related or user-related activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, communication-data collection component 210 receives or accesses data continuously, periodically, or as needed. For example, in some embodiments, communication-data collection component 210 accesses and/or receives a user's email communication or email account (or other type of account or inbox associated with other forms of electronic communications described herein), which may be accessed via data in user account(s) and devices 242 in a user profile 240 associated with the user. In some embodiments, communication-data collection component 210 accesses a user's email communication as a computing service operating within (or in connection with) an email application (such as Microsoft Outlook®), which may be a client-side or cloud-based application, or as computing service operating on (or in connection with) a server that processes user email, such as mail server.

Mention(s)s determiner 250 is generally responsible for determining mentions occurring in an electronic communication, such as an email. In some embodiments, mention(s) determiner 250 comprises one or more applications or services that analyzes communication-related data to determine mentions and/or recipients (or individuals or groups) corresponding to the mentions. As used herein, the term mention comprises a reference, to one or more recipients, that occurs in a message body of an electronic communication. For instance, a mention may comprise a name (including a nickname, first name, last name, email address), pronoun, a reference, or an indication of one or more recipient(s) in regards to aspects of the electronic communication, or an intention by the sender that an aspect of the electronic communication is associated with the recipient(s). For example, an email with a message body of "Tom, please send me the file," and wherein Tom Jones is a recipient of the email, may be determined to have a mention indicating Tom Jones in the message body. A mention may indicate a single recipient, such as Tom Jones, in the previous example, or may indicate a plurality of the recipients, such as a mention of "Paola's team" in a portion of an email message body that is intended for at least some of the recipients of the email. (Although the term body or message body is generally used herein, it is contemplated that message bodies, such as the message content from related messages, also may be used by embodiments described herein. Additionally, a message body is generally described herein as comprising textual data, such as the body of an email. But in some embodiments, a message body may comprise a recording (e.g., audio, video, or multimedia), or other content or media of an electronic communication.) A mention may be implicit or explicit, as described herein.

Embodiments of mentions determiner 250 may receive communication-related data from communication-data collection component 210 and/or from storage 225, such as a user profile 240 associated with a particular recipient (or group of recipients), among other components of system 200. The communication-related data may comprise an electronic communication having a message body, such as the text or body of an email message. In some embodiments, the electronic communication (or the communication-related data) further comprises metadata that indicates (or may be used to determine) recipients of the electronic communication. For example, this metadata may include individuals or distribution lists identified in the "TO" or CC fields of an email.

In some embodiments the information determined by mentions determiner 250 comprises an indication (such as a listing or table entry in a relational database) of the one or more recipients corresponding to each mention in a message body and the corresponding location of the mentions. In some embodiments, mentions determiner generates a marked up or tagged version of the message body or determines pointers for specific mentions that logically point to or indicate the corresponding recipient(s). In some embodiments, mention determiner 250 may determine only mentions for a particular recipient, such embodiments operating on an email client or in connection with an email account associated with that particular recipient, as described previously. The output of mentions determiner 250 may be provided to POV determiner 260, section recipient(s) determiner 280, or other components of system 200, and/or may be stored in communication data 244 of a user profile 240, associated with a user recipient or a profile or data record associated with a group or user recipients (not shown).

Although in the examples described herein, a mention indicates or corresponds to a recipient of an electronic communication in which the mention occurs, it is also contemplated, in some embodiments, that a mention may correspond to a person (or group of people) that is not a recipient in some circumstances. For example, a mention may refer to an individual that is related to the communication, such as someone who might have been a recipient in one of a series of related communications (e.g., a thread of email where one of the messages refers to an individual that may not necessarily be a recipient of that message, but is included as a recipient somewhere in the thread). Similarly a mention may refer to an individual that is related to the communication, such as a member of a team that includes other recipients.

As shown in example system 200, mention(s) determiner 250 comprises a recipient(s) determiner 254 and a mention detector 256. In some embodiments, mention(s) determiner 250, one or more of its subcomponents, or other components of system 200, such as POV determiner 260, section recipient(s) determiner 280, or consumer application(s) 290 may determine interpretive data from received communication-related data. Interpretive data corresponds to data utilized by these and other components of system 200 or subcomponents to interpret communication-related data. For example, interpretive data can be used to provide other context to communication-related data, which can support determinations or inferences made by the components or subcomponents. Moreover, it is contemplated that embodiments of mention(s) determiner 250, its subcomponents, and other components of system 200 may use communication-related data and/or user data in combination with interpretive data for carrying out the objectives of the subcomponents described herein. Additionally, although several examples of how mention(s) determiner 250 and its subcomponents may determine mentions are described herein, many variations of mention detection or identification are possible in various embodiments of the disclosure.

Recipient(s) determiner 254, in general, is responsible for determining the recipient(s) of an electronic communication. As described previously, a recipient may comprise at least one user who receives an electronic communication, or to whom an electronic communication is sent. In some embodiments, the term recipient may refer to a plurality of users who receive an electronic communication, or to whom an electronic communication is sent. In some embodiments, the recipients of an electronic communication determined by recipient(s) determiner 254, may use used to determine a recipient identity indicated by (or associated with) a mention. Some embodiments of recipient(s) determiner 254 are further responsible for determining candidate section recipients for a particular section, as described herein. Accordingly, in these embodiments, the candidate section recipients of a particular section also or alternatively may use used to determine a recipient identity indicated by (or associated with) a mention.

Embodiments of recipient(s) determiner 254 may receive communication-related data, as described in connection with mention(s) determiner 250, such as an electronic communication. In some embodiments, the electronic communication (or communication-related data) may include metadata that indicates (or may be used to determine) one or more recipients of the electronic communication. Accordingly, some embodiments of recipient(s) determiner 254 utilize communication-related data, an electronic communication, and/or metadata to determine recipient(s) of the electronic communication. For example, this metadata may include individuals or a distribution list identified in the "TO" or CC fields of an email. In some implementations, recipient(s) determiner 254 may use a distribution list (or similar group-identification of communication recipients, attendees, or parties) to determine the recipients. For example, in the case of a distribution list or email addresses without corresponding user names, recipient(s) determiner 254 may access information in a mail server to determine a user name, user ID, account name, or other information identifying individuals who are recipients of the electronic communication (or attendees or parties of a communication). In some instances, metadata also may comprise data about related communications such as a communications that are part of a thread, share the same subject matter, or are exchanged within a group, such as a project team. Also, in some instances, metadata may comprise aspects of a company's an org chart, membership list or roster, group membership, information about a team or affiliation. Thus for example, in some embodiments, recipient(s) determiner 254 uses metadata comprising an org chart to identify the recipient(s) of an electronic communication or the candidate section recipient(s) for a section of an electronic communication.

Embodiments of recipient(s) determiner 254 may output information indicating the one or more recipients, each of which may be identified by email address, user name, user ID, account name, or other information identifying individuals who are recipients, and may further comprise any combination of this information identifying or associated with the individuals (for example, a username and email address). In some embodiments, recipient(s) determiner 254 generates a dictionary of recipients, which may be used by mention detector 256 to identify users corresponding to the detected mentions. The output may be provided to mention detector 256 among other components or subcomponents of system 200.

Mention detector 256, in general, is responsible for detecting mentions occurring in an electronic communication. Embodiments of mention detector 256 may receive communication-related data (such as an electronic communication, which may be received from communication-data collection component 210 or communication data 244 in user profile 240) and metadata and/or information about one or more recipients, which may be determined by recipient(s) determiner 254. Some embodiments of mention detector 256 receive a dictionary, as described above, from recipient(s) 254. The received communication-relate data may be processed to detect one or more mentions, and for each mention (or a particular mention) to determine one or more corresponding recipients. Thus a specific person (or group) may be identified for the mention. In some embodiments, mention detector 256 supplements the dictionary determined by recipient(s) determiner 254 with information indicating the mentions and locations within the message body for each of the recipients identified in the dictionary. Alternatively or in addition, mention detector 256 generates a data record that identifies the mentions in the message body and their corresponding recipients. In one embodiment, mention detector 256 generates a marked up or tagged version of the message body or determines pointers for specific mentions that logically point to or indicate the corresponding recipient(s).

In some embodiments, only mentions that correspond to a particular recipient (which may include mentions to a group to which the recipient is a member) are determined, as described previously. Thus, for instance, an email received by a particular user, although part of a group of recipients, would be processed to determine the mentions in the email message body that correspond to that particular recipient. These mentions then may be used to provide personalized computing service to that user, such as indications in an email for portions of the email that are directed to or relevant to the user, as described herein.

The mentions detected by mention detector 256 may be explicit or implicit; such as a pronoun; nickname, last name, or partial name; group/team name; references such as @person, @role, or @function; email address, tag or comment or other reference where no name is explicitly mentioned. For example, "Tom, please send me the file," includes an explicit mention to Tom. On the other hand, "Please send me the file" or "Will you please send me the file?" includes an implicit mention that is the person to whom the statement is directed. An implicit mention may be determined from a different section of the message body; for instance, if the previous sentence is, "Tom, when you are finished with your analysis, please add it to the file," Then Tom may be determined as an implicit mention for the next portion of the message that is "Please send me the file." In some embodiments, an implicit mention may be determined where a portion or section of the message body that has an explicit mention is related to another portion by topic or subject matter. For instance, continuing the above example, if the message included "Tom, when you are finished with your analysis, please add it to the file," followed by other text that is not related to the file or Tom, and then at the end of the message, "Please send me the file once the analysis has been added." Then it may be determined that this portion of the message is related to the earlier portion (e.g., because it has to do with adding the analysis to the file) and thus, Tom is an implicit mention for this last portion of the message.

In some embodiments, mention detector 256 uses one or more entity extraction models or entity extraction logic 233 to detect a mention in the message body, and/or determine a recipient corresponding to the mention. Entity extraction logic 233 may comprise computer instructions including rules, conditions, associations, classification models, or other criteria for detecting a mention and/or for determining one or more recipients corresponding to a mention. For example, in some embodiments, entity extraction logic 233 may be used to determine a mention in the message body by detecting an object in the text (or data) of the message body, such as a name, reference which may be implied or explicit, pronoun, or entity or entity reference, for example, that is an entity or indicates an entity that potentially corresponds to the identity of a recipient. Some embodiments of entity extraction logic comprise one or more entity extraction models. Thus, for example, an entity extraction model may be used for determining object in the text that are typically names In some implementations the entity extraction logic 233 determines that a pronoun refers to a name elsewhere in the text, and thus determines the name entity corresponding to the pronoun. Similarly, some implementations identify implicit references to an name, e.g., the sentence "send the file" which has an implied subject.

Accordingly, entity extraction logic 233 can take many different forms depending on the particular implementation, such as whether only explicit names are detected as mentions, or whether implicit mentions are also detected, as well as whether only named recipients or recipients in groups are considered when determining a recipient corresponding to a mention. In some embodiments, entity extraction logic 233 comprises one or more entity extraction models and/or comprises named-entity recognition (NER) logic, which may further comprise logic or computer instructions for performing named entity identification, entity chunking, and/or named entity extraction. Entity extraction logic 233 may be utilized to locate or classify named entities or references to entities occurring in unstructured text, such as the message body of an electronic communication. In some embodiments, entity extraction logic 233 annotates or tags the unstructured text with labels indicating an named entity or likely named entity or similar entity classification. Examples of entity extraction models and/or named entity recognition logic that may be utilized as part of entity extraction logic 233 may include Apache OpenNLP, the spaCy NER Model, and the Stanford Named Entity Recognizer, or similar models. In some embodiments, entity extraction logic 233 may additionally or alternatively comprise one or more natural language processing (NLP) models, trained artificial neural networks, fuzzy logic, finite state machine, support vector machine, logistic regression, or machine-learning techniques, similar statistical classification processes, or combinations of these for detecting and/or classifying an object as a likely mention and/or determining likely recipients corresponding to a detected mention. Additionally or alternatively, rules such as Boolean, various decision trees (e.g., random forest, gradient boosted trees, or similar decision algorithms), conditions, or other logic may be employed to detect an object that is a mention and/or to determining likely recipients corresponding to a detected mention.

In one embodiment, entity extraction logic 233 includes instructions for using communication metadata, such as a distribution list, related communications (e.g., in a thread), or org chart, to identify a recipient or a potential recipient based on a detected mention. For example, instructions may specify performing a comparison of aspects of the mention (e.g., the text of a name) with information listed in the org chart (e.g., other names) to determine a match, in order to identify a likely identity of a mention. A similar process may be performed using a distribution list. In some embodiments of entity extraction logic 233, rules or associations may include instructions for identifying pronouns, and their corresponding named noun, or detecting implicit mentions (e.g., based on previously occurring explicit mentions or other portions of the message that are related to a portion containing an explicit mention).

Continuing with system 200 of FIG. 2, POV determiner 260 is generally responsible for determining a point of view of a particular mention with regards to the message body. In particular, as a mention corresponds to a recipient, a POV for the mention may be determined to be a second-person POV (POV2) or a third-person POV (POV3). This is because the sender of the communication (or the speaker or originator of the message body or content) may be considered the as a first-person POV or perspective. For instance, in the example of "Tom, send the file to Paola," where Tom Jones and Paola Smith are determined as mentions, the particular mention of Tom may be determined as having a second-person POV (POV2), because the sentence is directed to Tom. The particular mention of Paola may be determined as having a third-person POV (POV3), because the sentence is not directed to Paola, but it is relevant to her. (Paola thus may be considered a third-party to the sentence.)

Embodiments of POV determiner 260 may receive communication-related data, such as an electronic communication, from communication-data collection component 210, mention(s) determiner 250, or communication data 244 in storage 255. POV determiner 260 also may receive information indication one or more mentions determined by mention(s) determiner 250 or mention detector 256. For example, POV determiner 260 may receive the supplemented dictionary or recipients, the mentions that correspond to the recipients, and the locations of the mentions in the message body, or may receive the marked up or tagged version of an electronic communication indicating mentions and corresponding recipient identities, or other data indicating mentions.

For each mention (or at least one mention) received, POV determiner 260 determines a point of view (POV) for the particular mention in regards to the message body. In some ways, POV determiner 260 maybe considered to classify the POV of a mention as a feature of the mention. Thus the determined POVs for the mentions may be considered as features of the mentions, or more generally data features of the electronic communication. Embodiments of POV determiner 260 output a corresponding POV a mention. Some embodiments my further supplement the dictionary described previously with an indication of the POV for each mention in the dictionary (e.g., POV2 or POV3). Some embodiments of POV determiner 260 may generate a further marked up or tagged version of an electronic communication to include an indication of POV for each mention. Some embodiments of POV determiner 260 may generate a message feature-vector comprising information indicating one or more mentions, mention locations, corresponding POV to the mention, and/or recipient(s) indicated by the mention. Additionally or alternatively, some embodiments of POV determiner 260 generate a data record, which may be stored in a database, such as a relational database, with POV-related entries corresponding to the mentions and/or mention locations in a message body of an electronic communication. Some embodiments may include the determined POV (and in some instances the corresponding mentions, mention locations in the message body of an electronic communication, and/or the recipient(s) indicated by the mentions) as metadata associated with the electronic communication. The output of POV determiner 260 may be provided to section recipient(s) determiner 280, or another component of system 200, or stored in communication data 244.

In some embodiments, POV determiner 260 uses POV determination logic 235 to determine (or to classify) the POV for a mention. POV determination logic 235 may comprise computer instructions including rules, conditions, associations, classification models, or other criteria for determining the POV for a name or mention based on features of the message body or communication-related data. In some embodiments, POV determination logic 235 comprises one or more POV models that utilize one or more features associated with or characterizing a particular mention to classify the POV of the mention. POV determination logic 235 may take different forms depending on the particular message features (or message feature vector values) evaluated for determining POV of a mention, and may comprise a set of rules, such as Boolean logic, various decision trees (e.g., random forest, gradient boosted trees, or similar decision algorithms), conditions, or other logic, a deterministic or probabilistic classifier, fuzzy logic, neural network, finite state machine, support vector machine, logistic regression, or machine-learning techniques, similar statistical classification processes, or combinations of these to determine or infer a likely POV for a particular mention.

In some embodiments, mention features are extracted from the electronic communication. Accordingly, some embodiments of POV determination logic 235 (or POV determiner 260) include computer instructions for performing a feature extraction or a feature determination operation for aspects of the electronic communication associated with the mention. In some embodiments, the feature extraction operation examines each message and extracts, or parses, the message for features. Aspects of the communication message, including the message body, may be analyzed to determine or extract a set of mention features for a mention. By way of example and not limitation, these aspects of the message body may comprise: one or more words occurring in the message body in proximity to the mention (for example: n-words, such as three words, occurring before and/or after the mention, the words occurring in same sentence or the same paragraph as the mention, or the presence of specific types such as conjunctions), and/or information about parts of speech of these one or more words (for example: noun, verb, adjective, or other parts of speech), and/or n-grams before, after, or in proximity to the mention, such as two-grams connecting with the mention; punctuation and/or indentation occurring in the same sentence or paragraph of (or in proximity to) the mention in the message body; a location of the mention within a sentence and/or paragraph of the message body (for example: at the beginning or end of a sentence), and/or the mention's location within the message body; or other aspects of the message body or more generally, the electronic communication. In some embodiments, the features may additionally or alternatively include, by way of example and without limitation, information about message recipients (including categories for those the message was sent directly to, those who were copied, or whether the message was forwarded), information derived from the content of the message, which may include the message subject line or heading (e.g., topics, entities, such as places or people, events, projects, action items, requests, files, or other information) in the message, or attachments to the message.

In some embodiments, the instructions of POV determination logic 235 includes instructions for determining a cluster of mentions. A cluster of mentions may comprise two or more mentions (which may be implicit, explicit, or a combination of implicit and explicit mentions) detected together or near each other in a message. A cluster of mentions shares the same POV. For example, the in message section "Tom and Jane, please complete the slides by Friday," the mentions for Tom and Jane comprise a cluster of mentions having the same POV (here, POV2). In some embodiments, POV determination logic 235 include computer instructions for identifying and using certain types of words or punctuation (for example, conjunctions, such as and, or commas among a plurality of mentions) for detecting a likely cluster of mentions, such as "Tom, Jane, and Bob, please send include your analyses," where Tom, Jane, and Bob comprise a cluster of mentions. Similarly, the computer instructions may identify and use features associated with a plurality of mentions detected together, or near each other, to determine that the plurality is not a cluster of mentions. For example, this may include the presence of certain words and/or the parts of speech or the words, or certain punctuation, a determination by POV determiner 260 that two mentions, of the plurality of mentions that potentially form a cluster, likely have different POVs, or other features that indicate an unlikely cluster. For example, the in message "Tom, Jane told me that you need something" although a comma separates Tom and Jane, the feature of the 2-gram "told-me" following Jane may be used to determine Jane is likely a POV3, while the exhortation of Tom at the beginning of the sentence may comprise a feature that indicates Tom is likely POV2. Thus, in this example, Tom and Jane would not be a cluster of mentions.

Continuing with system 200 of FIG. 2, message body parser 270 is generally responsible for partitioning or dividing a message body into one or more sections. For example, a section may comprise a sentence, paragraph, or portion of a message body. Some embodiments of message body parser 270 further label sections with a section identifier or ID (e.g., section01, section02, etc.), and in some embodiments, generate a map or index for the section identifiers (or indications of the sections or identifier) to the message body. Some embodiments of message body parser 270 may determine logical partitions of a message body, so that the message remains intact, but such that each portion or section can be identified. In some embodiments, each section is non-overlapping. In other embodiments, sections may be overlapping, or sections may have subsections.

Embodiments of message body parser 270 output information indicating the one or more sections of the message and corresponding section IDs or section names Some embodiments output the generated map or index for the section identifiers (or indications of the sections or identifier) to the message body, as described above. For embodiments having overlapping sections or subsections, a hierarchical indexing or identification may be used, for instance, section01.3 would indicate the third subsection in section01. The output of message body parser 270 may be stored in communication data 244 and/or provided to section recipient(s) determiner 280, or other components of system 200.

Some embodiments of message body parser 270 use parsing logic (not shown) to determine message section parses. Parsing logic may comprise rules, message features, and computer instructions for analyzing a message body to determine a section. For example, one simple rule may be to parse each sentence into a section, in which case a period may be used to identify the end of a sentence, or where punctuation is missing, each sentence may be determined as including a subject and predicate (or noun and verb). Similarly another rule may be to consider each paragraph as a section, or each portion of text following an indentation or separated by carriage returns as a section. Some rules or parsing logic may consider topic or subject matter similarity in adjacent sentences to determine that the sentences are related and thus should be in the same section. Where the message being parsed is a meeting transcript or a chat session, a section may correspond to an utterance by an attendee or a chat by a chat session participant. Further, in some implementations a particular utterance or a particular chat may be parsed into multiple sections, such as where the topic of the chat or utterance changes. Accordingly, in this way or similar ways, embodiments of message body parser 270 (or parser logic) use rules, grammar, carriage returns, punctuation, indentation, spacing, formatting, subject matter similarity or other similarity logic, or other features of a message body to parse the message body into one or more sections.

Section recipient(s) determiner 280 is generally responsible for determining one or more recipients that a section of an electronic communication is intended for. As described previously, a section of a message in an electronic communication may be intended for only some of the recipients of the electronic communication. Embodiments of section recipient(s) determiner 280 determine one or more mentions that are associated with a particular section, which are sometimes referred to herein as "section mentions" of the particular section. Based on the section mentions associated with the particular section, the corresponding recipient(s) may be determined. For example, once the section mention(s) for a section are determined, section recipient(s) determiner 280 (or other components of system 200) can use the output of mention(s) determiner 250 to determine the particular recipients that are identified by the section mention(s). Further, based on the POV for each mention that is determined by POV determiner 260, some embodiments of section recipient(s) determiner 280 also may determine, for a section, whether the section is directed to the particular recipient(s), as a POV2 or the section is relevant to the particular recipient(s), as POV3. In particular, although a section may be intended for all of the section mentions for that section, some of those section mentions may have a corresponding POV2 and others may have a corresponding POV3, such as the example "Tom, please send the file to Paola," where Tom is POV2 and Paola is POV3. Thus a particular section may be considered to be directed to its section mentions having a POV2 and the section may be considered to be relevant to its section mentions having a POV3. Further still, in some instances, a particular section may be determined to have no section mentions, and in other instances, the section may be determined to have multiple section mentions.

Some embodiments of section recipient(s) determiner 280 may designate a section mention as an intended recipient of the section based on the POV corresponding to the section mention. For example, in some implementations, only section mentions determined to have a second-person POV (POV2), or only section mentions determined to have a third-person POV (POV3), are designated as the intended recipients of the section. Alternatively or in addition, some embodiments of section recipient(s) determiner 280 may use the POV corresponding to a section mention to designate the section mention as either a POV2 intended recipient of the section, if the POV corresponding to the section mention is determined as POV2, or designate the section mention as a POV3 intended recipient, if the POV corresponding to the section mention is determined as POV3.

Embodiments of section recipient(s) determiner 280 receive section information and mention information for an electronic communication. The section information may be received from message body parser 270, and the mention information may be received from POV determiner 260. For example, in one embodiment, the received section information comprises a map or index of section identifiers for a message body of the electronic communication, such as described above in connection with message body parser 270, and the received mention information comprises an output of POV determiner 260 indicating one or more mentions and a POV for the mention(s). Using this information, recipient(s) determiner 280 can determine the section mention(s) for each section, and because the POV of those section mention(s) has been determined, it can be further determined that a section is directed to a particular section mention, or relevant to a particular section mention, based on the POV of the section mention(s). Alternatively, some embodiments of section recipient(s) determiner 280 may receive information regarding mentions without the corresponding POV information for the mention, and using that information, in conjunction with the section information, determine that a section is intended for a recipient without also determining whether the section is directed to or relevant to the section, based on the POV.

Embodiments of section recipient(s) determiner 280 output information indicating the section mention(s) for a particular section of a message body, (for example, the mentions that are determined to be associated with that particular section). In some embodiments, this outputted information further includes the recipient(s) indicated by the section mentions, and/or the corresponding POV for each of the section mention(s). The outputted information may be considered, and sometimes referred to herein as a recipient-section pair. For example, a recipient-section pair may comprise a section ID paired with a recipient, wherein the recipient is indicated my a mention associated with the section that is identified by the section ID. The recipient-section pair also may indicate whether the recipient is a POV2 or POV3 for the mention. In some embodiments, section recipient(s) determiner 280 outputs a mapping or index of recipient-section pairs, indicating a particular recipient, the message sections associated with mentions of that recipient, and, in some instances, the POV for those mentions. For instance, in a message body where Tom is mentioned in sections 1, 3, and 6, and where the POVs for those mentions were determined as POV2, POV2, and POV3, respectively, an example mapping may comprise: TOM: section01-POV2; section03-POV2; section6-POV3. Some embodiments of section recipient(s) determiner 280 may generate a mapping for all of the recipients determined to be intended recipients of at least one section of the electronic communication. For example, section01-POV2: recipientA, recipientC, recipientD; Section01-POV3: RecipientB; Section04-POV2: recipientA, where recipients A-D are individuals or groups identified as recipients of the electronic communication. Some embodiments may supplement a dictionary, such as described above in connection with POV determiner 260, with section information, such as a section ID, for each section that is determined to be associated with the mentions included in the dictionary. Thus, one example of the dictionary may comprise an entry for one or more recipients of a message, and for each recipient entry, the mention(s) in the message that are determined to indicate that recipient, the POV determined for those mention(s) and the section ID of the section associated with those mention(s). In some embodiments, this information outputted by section recipient(s) determiner 280 may comprise, or may be formatted as, enhanced communication data. For instance, an enhanced communication data may include a data label for each section indicating the designated recipient(s) for the section, and in some embodiments, the corresponding POV of the recipient for that section. One example illustration, showing an enhanced communication data corresponding to an electronic communication that the data was determined from, is described in connection with FIG. 3B. In some implementations, any of these outputs by section recipient(s) determiner 280 described herein, may be formatted as or may comprise a table or entry in a relational database that indicates the corresponding electronic communication.

The output of section recipient(s) determiner 280 may be stored in recipient-section pairings 246 of user profile 240 or provided to other components of system 200, such as consumer application(s) 290 for enhanced communication data. For some embodiments that store the output in recipient-section pairings 246, the stored pairings may be for a particular recipient associated with a user profile 240. For instance, for a user profile 240 associated with Tom in the example above, the recipient-section pairings 246 for Tom may comprise the pairs: section01-POV2, section03-POV2, and section6-POV3.

As described above, section recipient(s) determiner 280 determines that a mention is associated with a section (or correspondingly determines that a section is associated with a mention). In some embodiments, section recipient(s) determiner 280 evaluates mentions as being associated with a particular section and determines a confidence indicating a likelihood or probability that the mention is associated with the section. Thus, in some embodiments the outputs of section recipient(s) determiner 280 described previously may further include a confidence that a mention is associated with a section, or in some instances that combination of mentions are associated with the section. For example, suppose an email is sent to a group of recipients identified by a distribution list called "Project_Group." The message begins by addressing everyone, and within the message body of the email, a first section mentions Tom and a second section following the first section does not mention any recipients. Thus there may be a first possibility that this second section is still intended for Tom and a second possibility that the second section is intended for all of the recipients. Accordingly, an example confidence for mentions associated with this second section may comprise: Section02: Tom 0.8, Project_Group 0.2. This example confidence indicates it is determined that the second section is most likely associated with Tom (0.8 chance) and less likely associated with all of the recipients, as identified by the Project_Group distribution list (0.2 chance). In some embodiments, the confidence that a mention is associated with a section may be provided as a vector of all possible (or the most likely) mentions associated with the section and corresponding confidences, or may be provided as a vector of the recipients for the message, or as a vector of the candidate section recipients for the section, with the vector including corresponding confidences that a mention indicating the recipient is likely to be associated with the section. For instance, [Section01: recipientA: 0.5|recipientB 0.2|recipientC 0.2|recipientB and recipientC: 0.05], which indicates the section identified by section ID "section01" is most likely intended for recipient A (confidence of 0.5) and least likely intended for both recipients B and C (confidence of 0.05).

In some embodiments, various enhanced computing experiences may be provided based on the particular confidence that a mention is associated with the section satisfying a confidence threshold. For example, a task tracking and management computer application may use information about intended recipients of a section (for instance, the section "Tom please send me the file.") only if the confidence is equal to or greater than 0.6 (or another threshold). In this way, the task tracking is less likely to include a task for a recipient that has a low confidence of being the intended recipient of the section. In some embodiments, the confidence threshold may be predetermined, configured based on user or administrator settings or preference (which may be specified in user preferences 248 of user profile 240), or based on a particular computing application or service that is providing the enhanced computing experience. For example, while a task tracking and management application may use a higher threshold to avoid tracking incorrect people associated with a task, an electronic communications application that provides visual indicators of sections of a message that are intended for a particular recipient may use a lower threshold, because there is less concern for user annoyance if a section of the message is incorrectly highlighted as being intended for the recipient.

Some embodiments of section recipient(s) determiner 280 use mention association logic 237 to determine a that a mention is associated with a section. Mention association logic 237 may comprise computer instructions including rules, conditions, associations, classification models, which may include one or more machine learning (ML) classification models, or other criteria for determining that a mention is associated with a section (which may include determining a likelihood or confidence that a mention is associated with a section). In some embodiments, section recipient(s) determiner 280, applying mention association logic 237, may use features or attributes associated with the mention and/or section being evaluated for association, or features or attributes of the electronic communication. For instance, mention association logic 237 may include instructions for using features, as further described herein, such as by way of example and without limitation: whether the mention is within the section or not; the location of the mention in the section, if it is in the section; the presence of other mentions in the section and their locations with regard to the mention or the locations of the other mentions in the section; the location of the mention with respect to the section, if the mention is not within the section; a distance from the mention to the section, which may be determined based on words or characters separating the mention and section, or the number of other sections in between the mention and the section; the POV for the mention and/or for other mentions in the section or other mentions in the message body; the location of the section and/or of the mention in the message body; the number of other mentions in the message body; the number of other mentions in the message body that indicate the same recipient(s) as the mention; whether the section is similar to a different section of the message and the mention occurs in the different section or the mention has been determined to be associated with that different section, which may be determined based on a feature similarity of features for the section and the different section and/or a comparison of the context, subject matter, topic, or occurrence of words, word frequency, or TF-IDF of the section compared to the different section in the message body that has the mention or has been determined to be associated with the mention; or other features or aspects of the electronic communication, which may include features that are learned by machine learning.

In some embodiments, mention association logic 237 may comprise conditional or static rules (which may be predefined or may be set based on settings or preferences in a user profile associated with the user), Boolean logic, fuzzy logic, or may comprise one or more statistical classification models such as logistic regression, Naïve Bayes, decision tree, random forest, support vector machine, neural network, finite state machine, clustering, other machine learning techniques or similar statistical classification processes, or other rules, conditions, associations, or combinations of these classification techniques to determine a likely association between a mention and a section. In some embodiments, different classification model(s) or techniques may be used for different types of mentions or different types of electronic communication.

Accordingly, mention association logic 237 can take different forms depending on the mechanism used to determine mention-section association and the electronic communication. For example, some embodiments of mention association logic 237 specify rules, conditions, and/or logic for determining whether a mention is associated with a section. For example, according to one embodiment, it is first determined whether the mention occurs within the section. If so, then the mention is considered to be associated with the section. In some embodiments, if the mention has a POV2, then section may be designated as being directed to the recipients indicated by the mention. Whereas, if the mention has a POV3, then the section may be designated as being relevant to the recipients indicated by the mention. Continuing the example, if the mention does not occur within the section, and another mention occurs within the section, then the mention association logic 237 may determine the other mention within the section to be associated with the section. If the mention does not occur within the section, and no other mentions occurs within the section then mention association logic 237 may specify to use the mention(s) associated with a previously occurring section. In other words, continue the association that was determined for the previously occurring section in the message body. In some embodiments, the POV of the mention may be used to determine whether the mention is associated with the section. For example, in some implementations, where a first mention in a previously occurring section has POV2 and the first mention does not occur in the subsequent section, but at least a second mention in the subsequent section has POV3 and no other mentions in the subsequent section have POV2, then both the first mention and the second mention may be determined to be associated with the subsequent section, according to some embodiments of mention association logic 237.

Continuing the example, if no mentions occur within the section (or in some embodiments, if no mentions having POV2 occur within the section) and there is no previously occurring section, then the section may be determined to be intended for all of the recipients, in this example embodiment. Alternatively if the mention does not occur within the section, then mention association logic 237 may specify to identify the nearest mention(s) in the message body, or the nearest earlier occurring mention(s), and associate those mention(s) with the section. Alternatively still, a rule may specify identifying the nearest POV2 mention(s) in the message body, or the nearest earlier occurring POV2 mention(s), and associating those POV2 mention(s) with the section.

Some embodiments of mention association logic 237 may include instructions for determining a relevance of one section to another section, which may be determined based on a comparison of section features indicating context, topic, words, or other features of the two sections, and the feature comparison satisfying a similarity threshold, or may be determined based on other types of section-feature similarity measures such as similarity distance measure or clustering techniques. In some embodiments, where one section is determined to be relevant to another section, then a mention that is associated with that other section may be designated as being associated with the related section, as well. Likewise, in some embodiments, where a particular section, that is determined to be relevant to another section, does not contain a mention, or does not to contain an explicit mention, or where the confidence of mentions of the particular section is low, then it may be inferred that any mentions associated with the other (relevant) section are also associated with the particular section.

Continuing with FIG. 2, example system 200 may comprise one or more consumer applications 290 for enhanced communication data. Consumer applications 290 may comprise one or more computer programs, routines, applications, or services that utilize aspects of an enhanced communication data (or utilize other aspects of determinations performed by the components of system 200). For instance, one example of a consumer application 290 comprises a smart reply computing service that generates one or more suggested replies for a recipient based on the sections of a communication determined to be intended for the recipient, and/or further based on the recipient's POV for those sections, as further described herein. In some embodiments, a consumer application 290 may be considered one example of an application or service (or set of applications or services) that may consume information about electronic communication as determined by implementations of the present disclosure.

At a high level, a consumer application 290 for enhanced communication data is generally responsible for providing an improvement to an electronic communication application or an improved computing experiences for users, such as a personalized computing experience. With reference to FIGS. 3A-3K, and with continuing reference to FIG. 2, aspects of a number of example consumer applications 290 are depicted including graphical user interfaces (GUIs) 300-309. Initially, turning to FIG. 3A, aspects of a graphical user interface (GUI) 300 of an electronic communication application are depicted showing an example electronic communication, more specifically, an email message 311. The graphical user interface 300 indicates at item 312 that the example email message 311 is sent from the "Boss" and further indicates at item 313 that email message 311 is sent to a "PROJECT_GROUP" distribution list and also to "TOM." Item 314 indicates that the subject of email message 311 is "Next Wednesday's Presentation." Lastly, example email message 311 is shown with a message body 315 that is: Hey all, Just circling back on next week's presentation. Tom, welcome back from your vacation! I hope it was relaxing. Please send the slides to Jane by Friday so she can edit them. Let me know when you're finished editing Tom's slides, Jane. Be sure to include updated sales projections, if needed. And please ensure the formatting is consistent. Thanks, Boss. Example email message 311 and GUI 300 depict an example email and an example email computing application without the improvements or enhanced computing experiences described herein, and are illustratively provided to serve as an example for the consumer applications 290 described in connection with FIGS. 3B-3J.

Figure 3A:
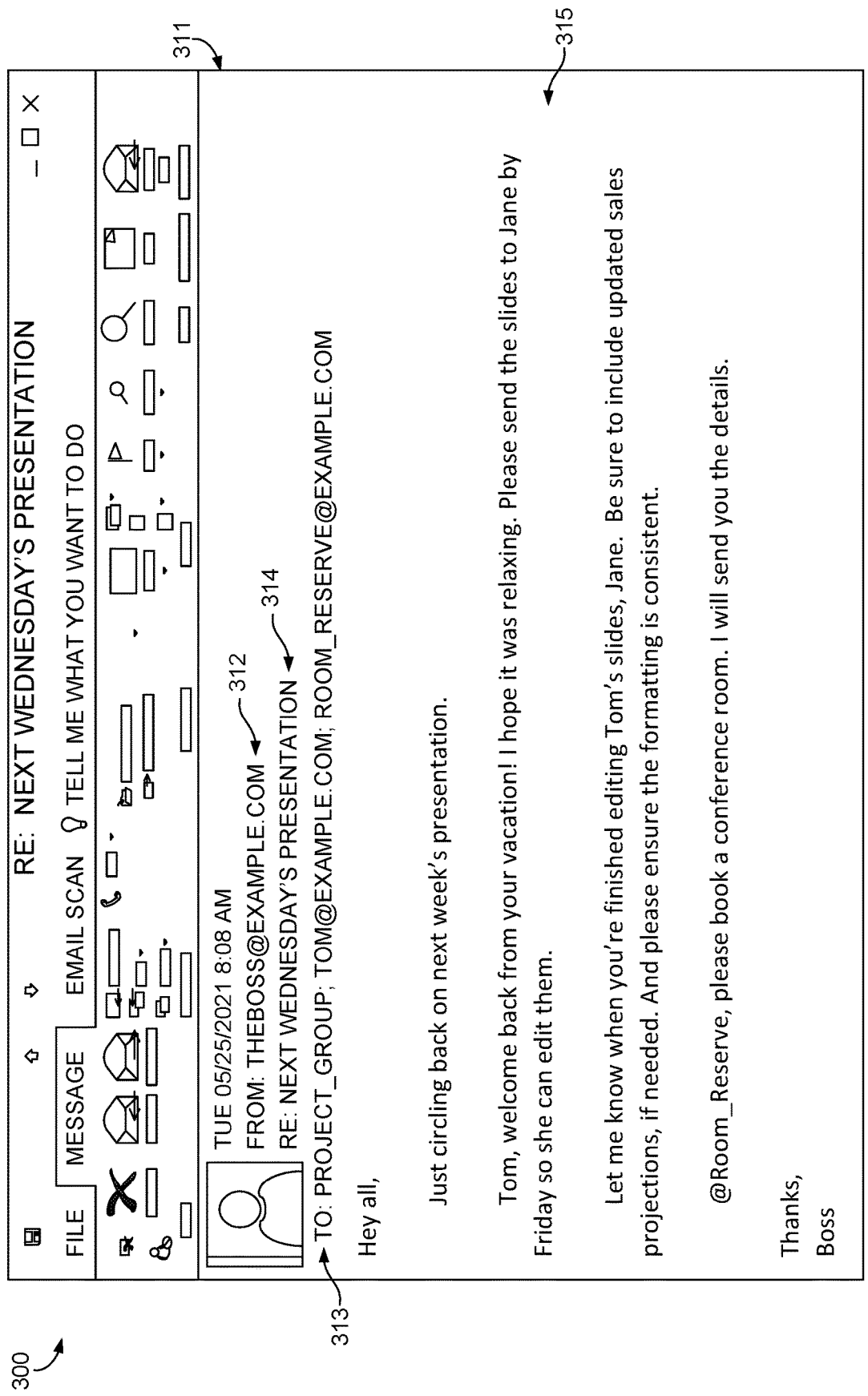
FIG. 3A illustratively depicts an example screenshot from a personal computing device showing aspects of an example graphical user interface of an electronic communications application, in accordance with an embodiment of the present disclosure.
Figure 3B:
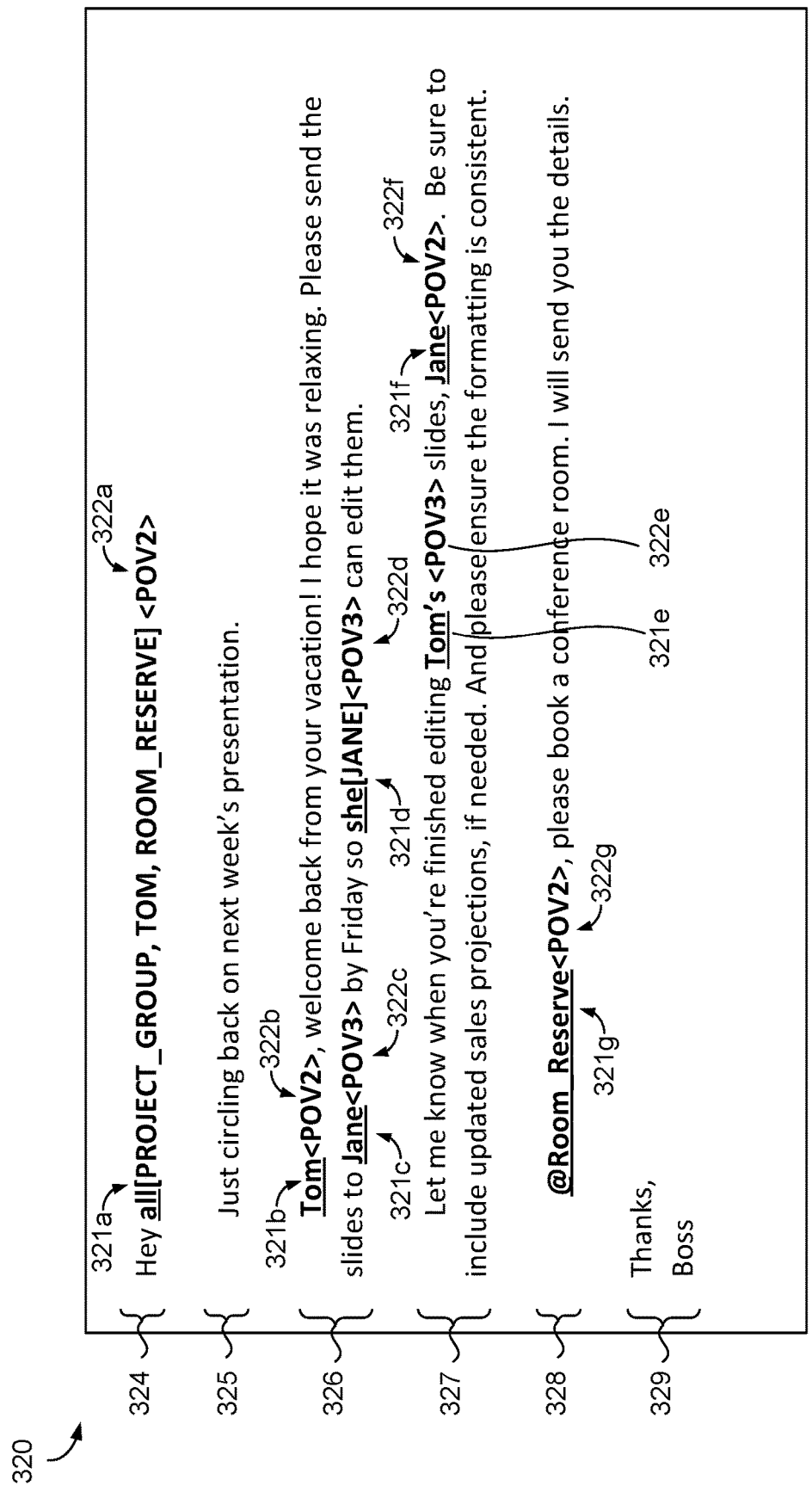
FIG. 3B illustratively depicts aspects of an example of an enhanced electronic communication that is generated according to an embodiment of the present disclosure.

Turning to FIG. 3B, with reference to FIG. 3A and continuing reference to FIG. 2, aspects of one example embodiment of an enhanced electronic communication 320 are illustratively provided. Enhanced electronic communication 320 may be generated by section recipient(s) determiner 280 or a consumer application 290. In some embodiments, enhanced electronic communication 320 may be generated from an enhanced electronic communication data provided by section recipient(s) determiner 280, and may be considered to represent aspects of the an enhanced electronic communication data. In some embodiments, enhanced electronic communication 320, or the enhanced electronic communication data used to generate it, may be used by other consumer applications 290 such as those described in FIGS. 3C-3K. Enhanced electronic communication 320 corresponds to the example email message 311 of FIG. 3A, and depicts aspects of mentions 321*a*, 321*b*, 321*c*, 321*d*, 321*e*, 321*f*, and 321*g* that are detected in email message 311. The mentions 321*a*, 321*b*, 321*c*, 321*d*, 321*e*, 321*f*, and 321*g* may be detected by mentions determiner 250, and may comprise explicit mentions (321*b*, 321*c*, 321*e*, and 321*f*) or implicit mentions (321*a* and 321*d*). For example, for mention 321*a*, "all" is determined to indicate every recipient of email message 311, which is the PROJECT_GROUP distribution list and TOM. As further shown, enhanced electronic communication 320 may include POV indications 322*a*, 323*b*, 323*c*, 323*d*, 323*e*, 321*f*, and 321*g* corresponding to each of the mentions 321*a*, 321*b*, 321*c*, 321*d*, 321*e*, 321*f*, and 321*g* For example, in the portion of the message, "Tom . . . Please send the file to Jane." POV indication 322*b* is POV2 for TOM, while POV indication 322*c* is POV3 for Jane. Example enhanced electronic communication 320 also shows a number of message sections 324, 325, 326, 327, 328, and 329. Accordingly, using enhanced electronic communication 320, it may be determined that, for instance, section 326 is intended for Tom and Jane, and more specifically is directed to Tom. as POV2. and relevant to Jane, as POV3.

In some embodiments, aspects of enhanced electronic communication 320 may be used for labeled training data for machine-learning applications. For instance, a mention and corresponding POV, such as mention 321*b* and POV indication 322*b*, or data labels of an enhanced communication data that may be used to generate enhanced electronic communication 320 may be used to generate the labeled training data. One example application is email spam filtering. Spam filtering technologies may utilize machine-learning and may be trained to more accurately distinguish legitimate email messages from unsolicited email or spam. Labeled training data that includes aspects of the data labels or the mentions with corresponding POVs, that are determined by embodiments of the technologies disclosed herein, may be used to characterize legitimate email from illegitimate spam, and thus provide valuable feature distinction in spam classification. In this way, some embodiments of the disclosure improve email filtering technologies.

Figure 3C:
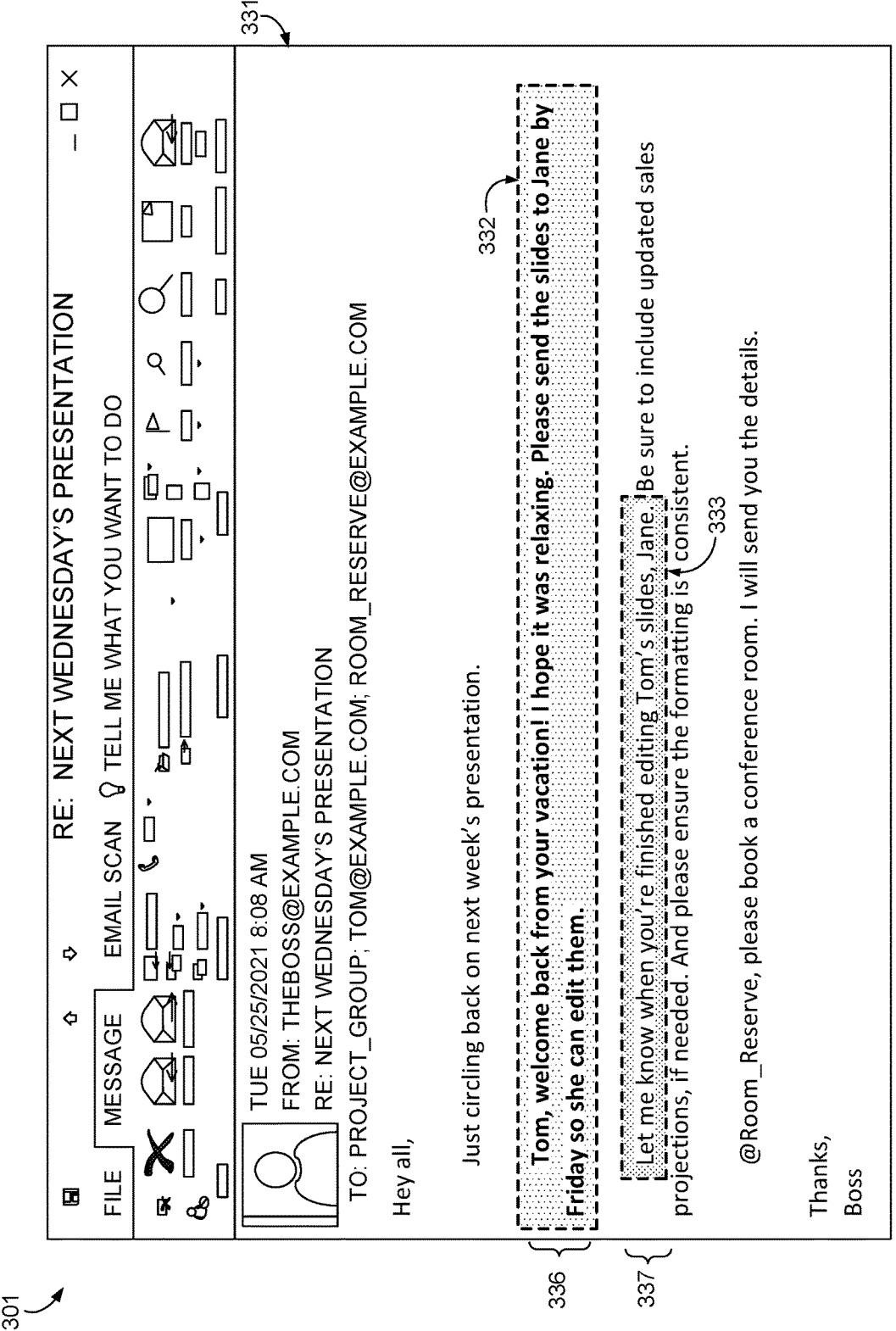
FIGS. 3C, 3D, and 3E illustratively depict example screenshots showing aspects of example graphical user interfaces of improved electronic communications applications that each include various enhanced computing functionality with regards to a first particular user and recipient of a message, in accordance with an embodiment of the present disclosure.
Figure 3D:
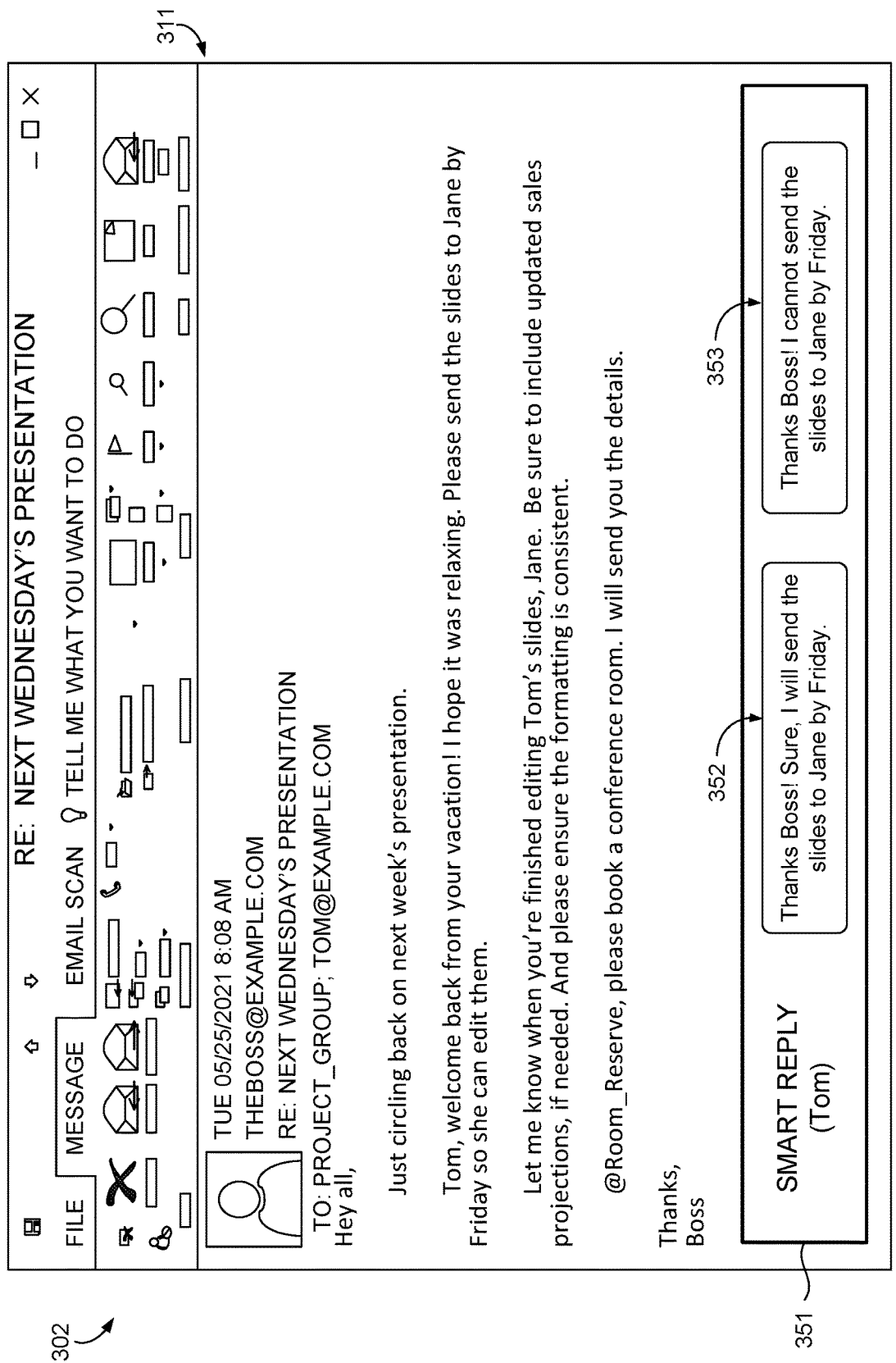
Figure 3E:
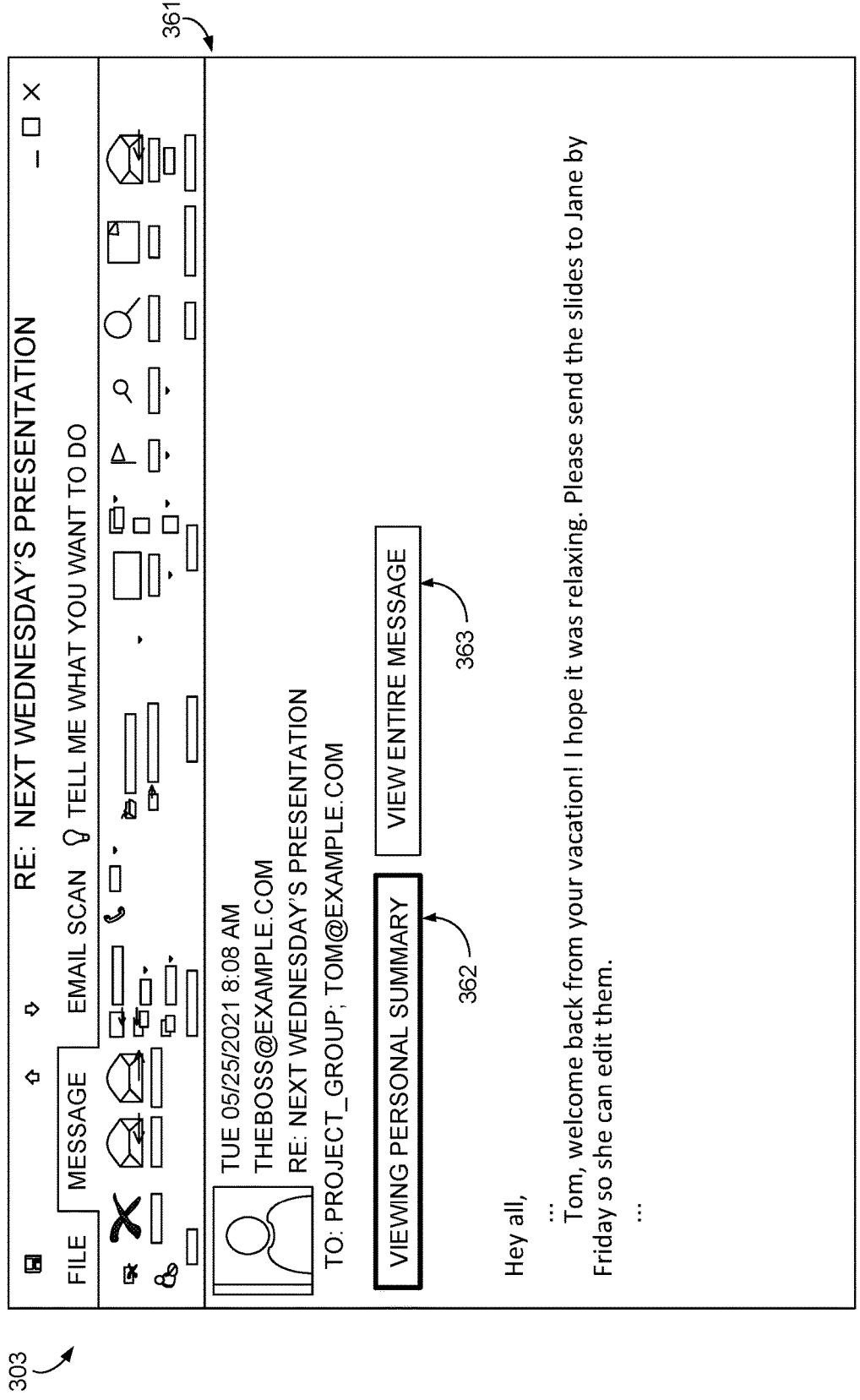
Figure 3F:
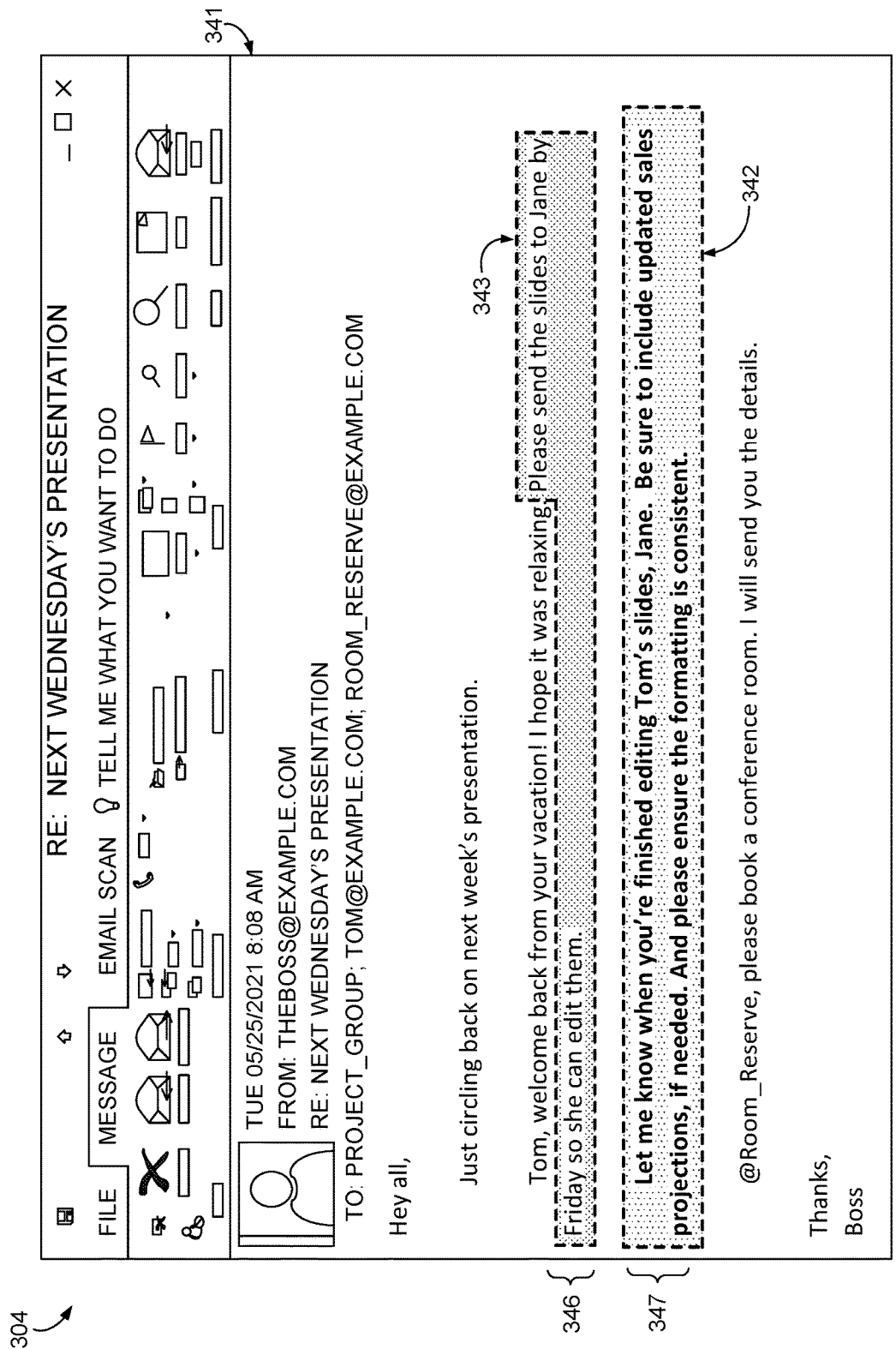
FIGS. 3F, 3G, and 3H illustratively depict example screenshots showing aspects of example graphical user interfaces of improved electronic communications applications that each include various enhanced computing functionality with regards to a second particular user and recipient of a message, in accordance with an embodiment of the present disclosure.

Turning now to FIGS. 3C and 3F, with reference to FIGS. 3A, 3B, and continuing reference to FIG. 2, an example embodiment of consumer application 290 comprises an electronic communications computing application, such as an email application, aspects of which are illustratively provided as GUIs 301 and 304, having functionality for displaying enriched information about electronic messages determined from the enhanced communication data. For example, enhanced communication data may be used by the electronic communications computing application or a computing service operating in conjunction with the electronic communications computing application, either of which is an embodiment of a consumer application 290, to determine and present a visual indicator associated with a section of an electronic communication that indicates its relevance to a user that receives the electronic communication. In some embodiments, a visual indicator that is presented may further indicate the corresponding POV of the particular section, or may indicate that the section is directed to the user, relevant to the user, or may not be relevant to the user.

Accordingly, aspects of first example are shown as GUI 301 of FIG. 3C, which depicts visual indicators 332 and 333 associated with sections 336 and 337, respectively, of an enhanced email message 331. Aspects of a second example are shown as GUI 304 of FIG. 3F, which depicts visual indicators 342 and 343 associated with sections 347 and 346, respectively, of an enhanced email message 341. Visual indicators 332, 333, 342 and 343 may comprise a highlight, color, shading, marking or label, or any combination of these, or a similar visual indication, such as described herein.

Enhanced email message 331 comprises message body 315 of email message 311 (described in connection with FIG. 3A) with visual indicators 332 and 333, and enhanced email message 341 comprises message body 315 of email message 311 with visual indicators 332 and 343. Each of enhanced email messages 331 and 341 may be determined based on enhanced electronic communication (described in connection with FIGS. 2 and 3B) or based on the enhanced electronic communication 320 (FIG. 3B).

With reference to FIG. 3C, visual indicators 332 and 333 indicate relevance of particular sections 336 and 337 of the email message 331 to Tom, who is a recipient of email message 311, as described in connection with FIGS. 3A and 3B. Thus Tom is an intended recipient of sections 336 and 337, as indicated by visual indicators 332 and 333. Visual indicator 332 further indicates that section 336 is directed to Tom as a POV2 recipient (which may be determined as described in connection with FIG. 3B and section-recipient(s) determiner 280). Visual indicator 333 further indicates that section 337 is relevant to Tom as a POV3 recipient (which may be determined as described in connection with FIG. 3B and section-recipient(s) determiner 280).

With reference to FIG. 3F, visual indicators 342 and 343 indicate relevance of particular sections 347 and 346, respectively of the email message 331 to Jane, who is also a recipient of email message 311, as described in connection with FIGS. 3A and 3B. Thus Jane is an intended recipient of sections 346 and 347, as indicated by visual indicators 342 and 343. Visual indicator 342 further indicates that section 347 is directed to Jane as a POV2 recipient (which may be determined as described in connection with FIG. 3B and section-recipient(s) determiner 280). Visual indicator 343 further indicates that section 346 is relevant to Jane as a POV3 recipient (which may be determined as described in connection with FIG. 3B and section-recipient(s) determiner 280). Some embodiments, may present only visual indicators corresponding to sections of a message body having POV2 for the recipient, such as visual indicator 332 for Tom and visual indicator 342 for Jane. Further, in some embodiments, a recipient-user may configure a settings associated with an electronic communication application to specify whether the recipient-user prefers to see visual indicators only for sections directed to the user, as POV2; for sections directed to the user, as POV2, and relevant to the user, as POV3; or not to be presented visual indicators.

Figure 3G:
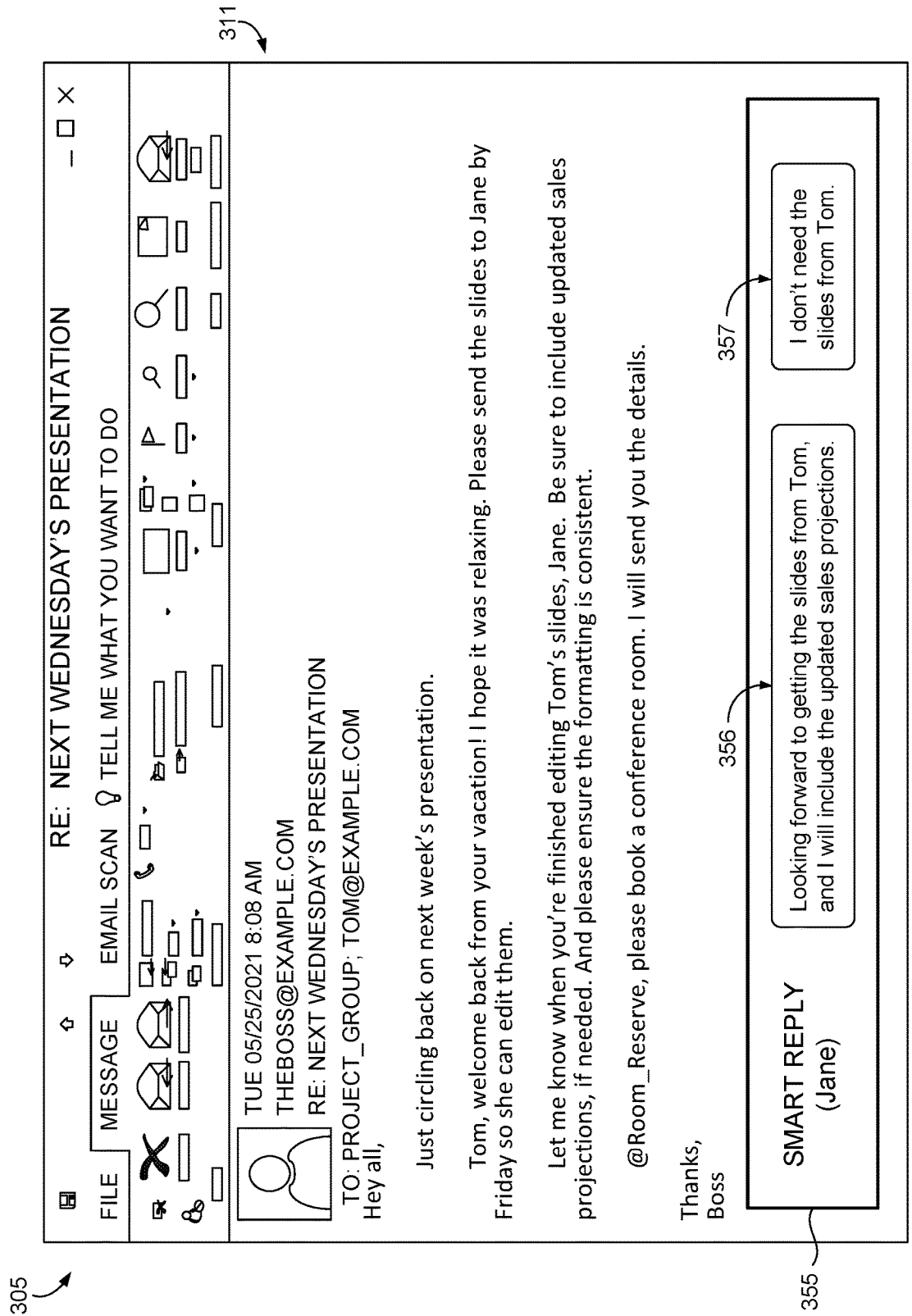

Turning now to FIGS. 3D and 3G, with reference to FIGS. 3A, 3B, and continuing reference to FIG. 2, another example embodiment of a consumer application 290 is described. This example consumer application 290 comprises an electronic communications computing application, such as an email application, or computing service operating in conjunction with the electronic communications computing application, having functionality for generating one or more suggested replies from a recipient of an electronic communication. A suggested reply comprises a second electronic communication from a recipient of a first electronic communication that responds to the first electronic communication. Aspects this example consumer application 290 are illustratively provided as GUIs 302 and 305. As described herein, suggested replies may be programmatically generated based on whether a particular section of an email message (for example, email message 311) is POV2 or POV3 with respect to a recipient of the email message for whom the suggested reply is generated. Thus, in some embodiments, the suggested reply will be different if a particular recipient for a particular section of email message is POV2 vs. POV3. In some embodiments, only suggested replies for sections determined to be POV2 for the recipient are generated.

Some embodiments use email-reply logic or employ an email-reply model (not shown) for generating an email reply, sometimes commonly referred to as a "smart reply" functionality of an email application. Smart reply functionality, or email-reply logic, also can include functionality for generating two or more suggested replies that are responsive in different or opposite ways. For example, two suggested replies to a question may be "yes I can" and "no I cannot." However this conventional smart-reply technology is deficient because it generates the same reply or replies for users, without regard to which section of an email is intended for a particular user, or whether a section is directed to the user or relevant to the user, based on the POV of the user for that section. In contrast, some embodiments of this disclosure mitigate this deficiency and thus improve on email smart-reply technology by generating replies that are personalized to a recipient based on a particular section of an email being intended for the recipient, and in some implementations, based further on the POV of that section. For example, some embodiments can provide the email-reply logic with (or input into the email-reply model) information indicating sections of the email that are intended for a particular recipient for which the reply is being generated. Further, information about the corresponding POV of the email section, or information indicating whether the section is directed to the recipient or relevant to the recipient may be provided. In this way, a reply that is generated by the email-reply logic or using the email-reply model is personalized and specific to the particular recipient, based on which section(s) of the email are intended for the recipient, and whether those section(s) are directed to or relevant to the recipient.

Accordingly, aspects of first example are shown as GUI 302 of FIG. 3D, which depicts a smart replies GUI element 351 having example suggested replies 352 and 353, each of which respond to email message 311 (described in connection to FIG. 3A). Aspects of a second example are shown as GUI 305 of FIG. 3G, which depicts a smart replies GUI element 354 having example suggested replies 356 and 357, each of which respond to email message 311 (described in connection to FIG. 3A). Suggested replies 352, 353, 356, and 357 may be programmatically generated based on enhanced electronic communication data or enhanced electronic communication 320 (described in connection with FIGS. 2 and 3B) indicating whether a particular section of email message 311 is POV2 or POV3 with respect to the recipient of email message 311 for whom the suggested reply is generated.

With reference to FIG. 3D, suggested replies 352 and 353 are generated with respect to recipient Tom of email message 311. As described in connection with FIG. 3B, section 326 of email message 311 is determined to be directed to Tom, because the mention to Tom is POV2. For reference, section 326 is Tom, welcome back from your vacation! I hope it was relaxing. Please send the slides to Jane by Friday so she can edit them. Accordingly, suggested reply 352 is Thanks Boss! Sure, I will send the slides to Jane by Friday, and suggested reply 353 is Thanks Boss! I cannot send the slides to Jane by Friday.

With reference to FIG. 3G, suggested replies 356 and 357 are generated with respect to recipient Jane of email message 311. As described in connection with FIG. 3B, section 327 of email message 311 is determined to be directed to Jane, because the mention to Jane is POV2, and section 326 is determined to be relevant to Jane, because the mention to Jane is POV3. For reference, section 326 is Tom, welcome back from your vacation! I hope it was relaxing. Please send the slides to Jane by Friday so she can edit them, and section 327 is Let me know when you're finished editing Tom's slides, Jane. Be sure to include updated sales projections, if needed. And please ensure the formatting is consistent. Accordingly, suggested reply 356 is Looking forward to getting the slides from Tom, and I will include the updated sales projections, and suggested reply 357 is I don't need the slides from Tom.

Turning now to FIGS. 3E and 3G, with reference to FIGS. 3A, 3B, and continuing reference to FIG. 2, yet another example embodiment of a consumer application 290 is described. This example consumer application 290 comprises an electronic communications computing application, such as an email application, or computing service operating in conjunction with the electronic communications computing application, having computer-performed functionality for generating a summary of an email, or modifying the email to include, or to prioritize, sections of the email that are intended for particular recipient, such as sections that are determined to be directed to or relevant to the recipient. As described herein, the modification or generated summary may be based on a POV corresponding to a mention of the particular recipient in each section.

Accordingly, aspects of a first example are shown as GUI 303 of FIG. 3E, which depicts an example personalized summary email 361 that is determined from email 311 (described in connection with FIGS. 3A and 3B). GUI 303 further depicts GUI elements 362 and 363, which correspond to GUI buttons for toggling presentation of the personalized summary email 361 or presenting the entire email message 311. Personalized summary email 361 is personalized for recipient TOM of email message 311, and comprises sections 324 and 326, which are the only sections of email 311 determined to be intended for Tom (as described in connection with FIG. 3B). Other sections of email message 311 that are determined not to be intended for Tom are omitted in the example personalized summary email 361.

Figure 3H:
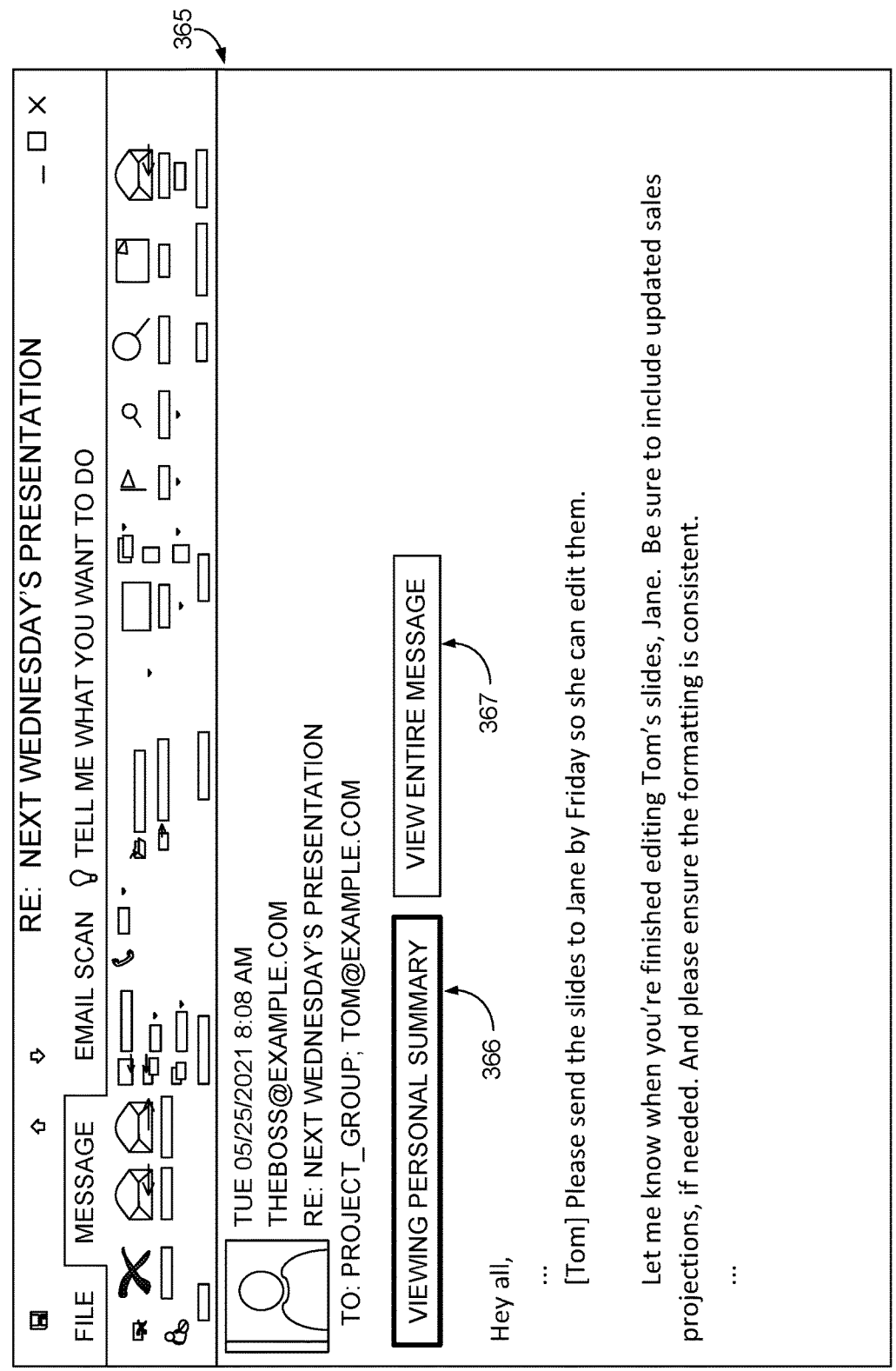

Aspects of a second example are shown as GUI 306 of FIG. 3H, which depicts an example personalized summary email 365 that is determined from email 311 (described in connection with FIGS. 3A and 3B). GUI 306 further depicts GUI elements 366 and 367, which correspond to GUI buttons for toggling presentation of the personalized summary email 365 or presenting the entire email message 311. Personalized summary email 361 is personalized for recipient Jane of email message 311, and comprises sections 324, 326, and 327, which are the sections of email 311 determined to be intended for Jane (as described in connection with FIG. 3B). Further, section 327 is determined to be directed to Jane, but section 326 is determined to be only relevant to Jane. Accordingly, only a portion of section 326 that is relevant to Jane is shown. Other sections of email message 311 that are determined not to be intended for Jane (or portions of sections that are not relevant to Jane) are omitted in the example personalized summary email 365.

Figure 3I:
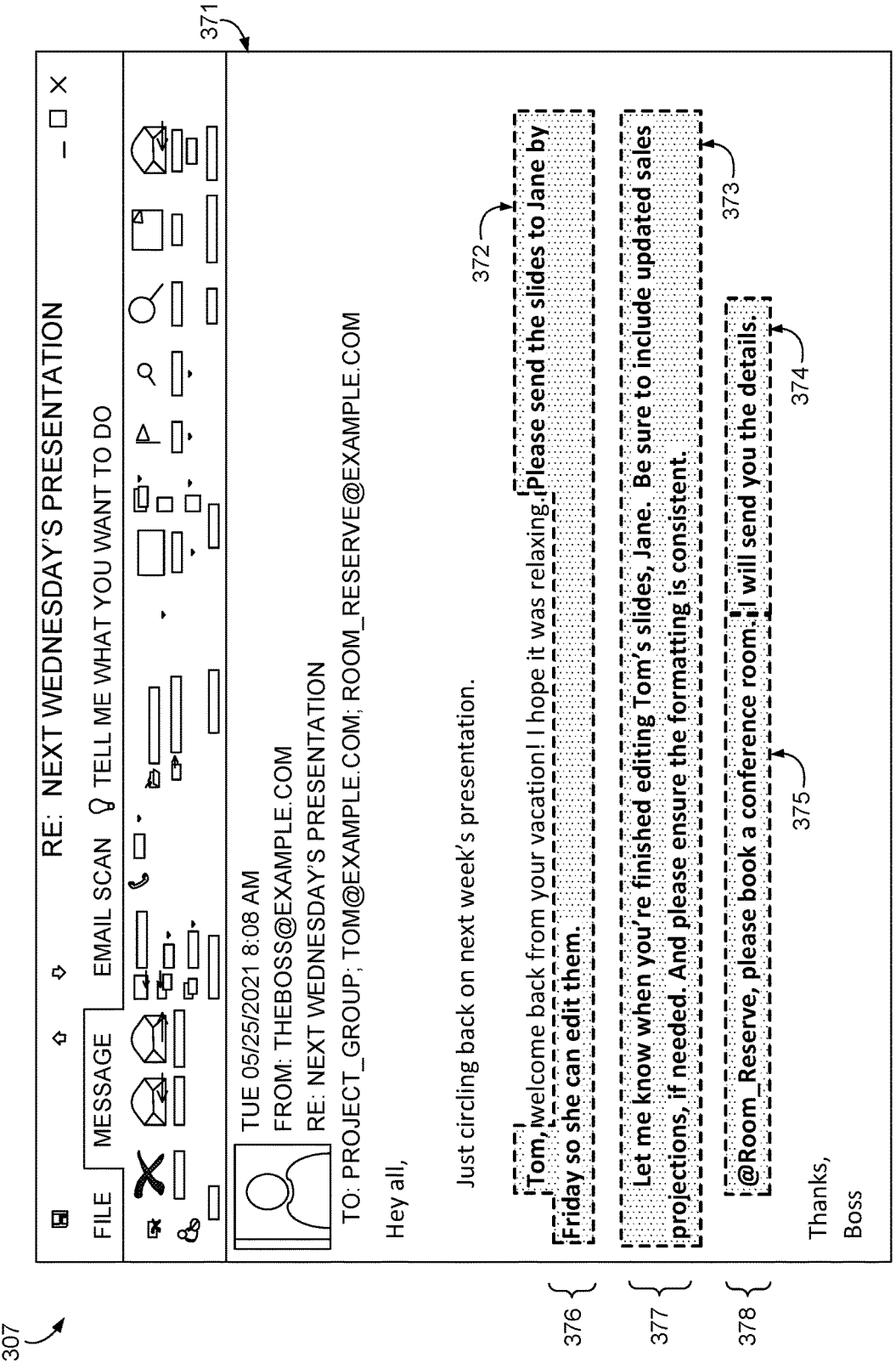
FIG. 3I illustratively depicts one example screenshot showing aspects of a graphical user interface of an improved electronic communications application having enhanced computing functionality with regards to a third particular user and sender of a message, in accordance with an embodiment of the present disclosure.

Turning now to FIG. 3I, with reference to FIGS. 3A, 3B, and continuing reference to FIG. 2, an example embodiment of consumer application 290 comprises an electronic communications computing application, such as an email application, aspects of which are illustratively provided as GUI 307, having functionality for displaying enriched information about electronic messages determined from the enhanced communication data. For example, as described in connection with FIGS. 3C and 3F, enhanced communication data may be used by the electronic communications computing application or a computing service operating in conjunction with the electronic communications computing application, either of which is an embodiment of a consumer application 290, to determine and present a visual indicator associated with a section of an electronic communication, such as an email. In some embodiments, visual indicators associated with an email may be provided to the sender of the email to indicate sections of the email intended for specific recipients, such as requests or task assignments made by the sender to a recipient. For example, a task, action item, commitment or request may be detected in the message body of an email such as message body 315, (or electronic communication), and assigned to a recipient using a task tracking and reminders management computing services.

Conventional task assignment functionality, which may be used by a task tracking and reminders management computing services, typically first recognizes a task item (or action item, commitment or request) in the email message body and then automatically assigns the task item to the recipient of the email. But this creates a problem of assigning every task to every recipient, and thus recipients who are not intended to be assigned a task are erroneously assigned the task. One way to mitigate this problem, and thus improve task tracking and reminders management computing technology is to assign tasks only to recipients determined to be intended for sections in which the task item is detected. But conventional task tracking and reminders management computing technology can be further improved by only assigning tasks to recipients for the sections, in which the task item is detected, that are determined to be directed to the recipients. For example, where a section has a mention with a POV2, then the section may be considered directed to that recipient, and thus if the section includes a task item, then the task item can be assigned to that recipient. In particular, by programmatically determining that a user is an intended recipient of a portion of a communication according to the user's POV, and providing this data to the task tracking and reminders management computing services the service can better distinguish and more accurately process incidents where the user is responsible for carrying out a task associated with the portion of the communication vs. incidents where a task that is associated with the portion of the communication is merely relevant to the user.

Accordingly, example GUI 307 depicts visual indicators 372, 373, and 374 that correspond to sections 376, 377, and 378, respectively, of an enhanced email message 371. Visual indicators 372, 373, 374, and 375 may comprise a highlight, color, shading, marking or label, or any combination of these, or a similar visual indication, such as described herein. Enhanced email message 371 comprises message body 315 of email message 311 (described in connection with FIG. 3A) with visual indicators 372, 373, 374, and 375, and may be determined based on enhanced electronic communication (described in connection with FIGS. 2 and 3B) or based on the enhanced electronic communication 320 (FIG. 3B).

Example GUI 307 may be presented to a sender of email message 311, showing the sender the enhanced email message 371. Thus, visual indicators 372, 373, 374, and 375 indicate the sections of email message 311, which are sections 376, 377, and 378, intended for specific recipients. In this example, sections 376, 377, and 378 correspond to task assignments or commitments made by the sender. For example, sections 376 and 377 assign tasks to Tom and Jane, respectively. Section 378 assigns reserving a conference room to @Room_Reserve, and also makes a commitment by the sender to send the details to @Room_Reserve.

The visual indicators 372, 373, 374, and 375, and/or the sections 376, 377, and 378 having intended recipients and the identify of those recipients (Tom, Jane, and @Room_Reserve) may be determined from an enhanced communication data, as described in connection with section recipient(s) determiner 280 or FIG. 3B. This information (or a portion of it) may be provided to a task tracking and reminders management computing services to more accurately assign a task or commitment, because the assignment can be based on the intended recipient(s) of the section, and in some embodiments, further based on a POV. In this way, only recipients to whom a section of an electronic communication is directed to (for example, as POV2) are assigned a task item determined from that section.

Figure 3J:
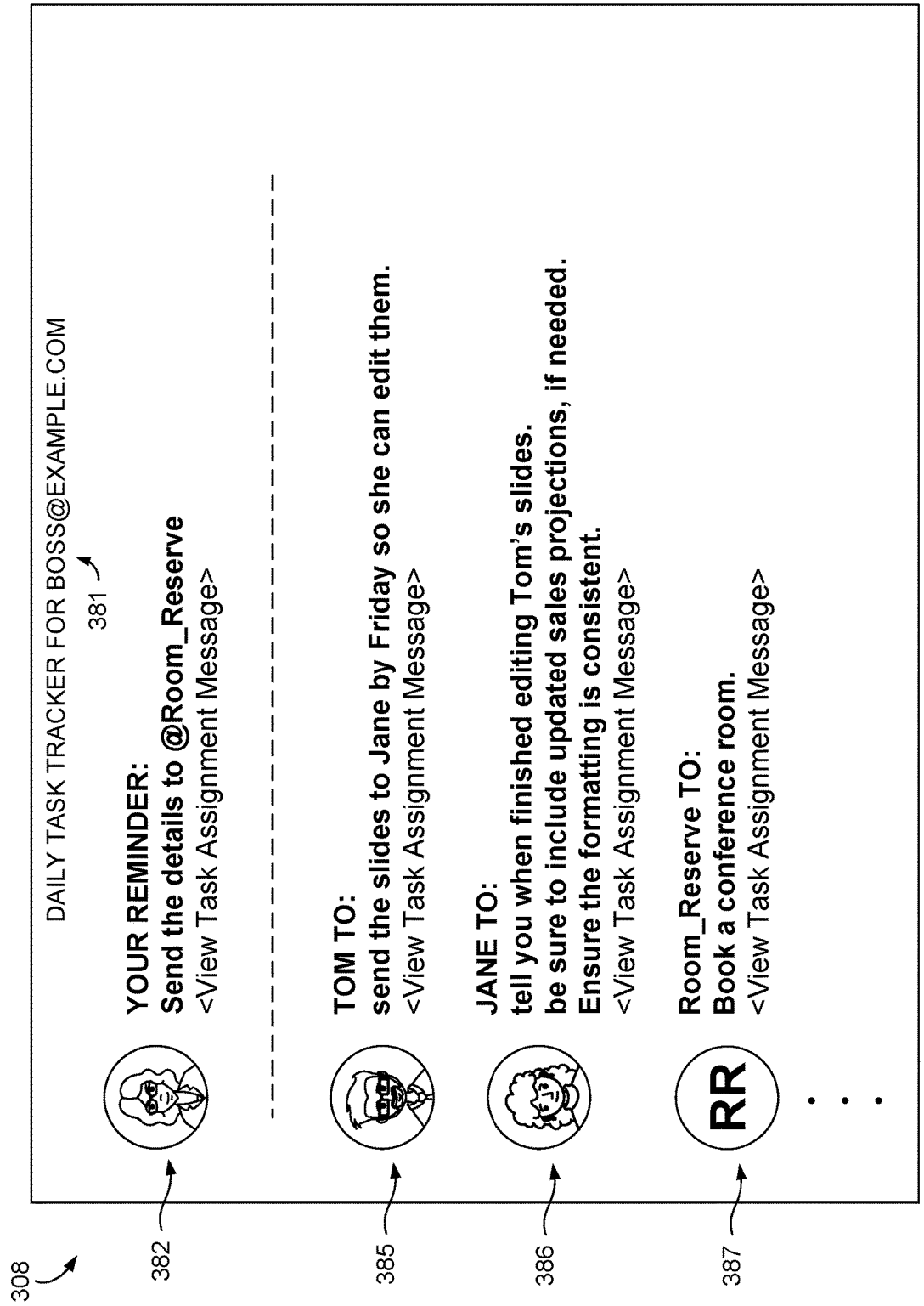
FIG. 3J illustratively depicts one example screenshot showing aspects of a graphical user interface of an improved task tracking and management computer application with respect to the user-sender of the example message depicted in FIG. 3I, in accordance with an embodiment of the present disclosure.
Figure 3K:
FIG. 3K illustratively depicts a screenshot showing aspects of a graphical user interface of an example daily briefing email to the user-sender of the example message depicted in FIG. 3I, which may be generated by an improved task tracking and management computer application, in accordance with an embodiment of the present disclosure.

Turning now to FIGS. 3J and 3K, with reference to FIGS. 3A, 3B, and continuing reference to FIG. 2, still other examples embodiment of consumer application 290 are illustratively depicted, as GUIs 308 and 309. GUI 308 depicts an example screenshot of a task tracking and reminders management computing application (an example consumer application 290) that includes various tasks (385, 386, and 387) and commitments (382) for an individual, identified at item 381 as Boss. In particular, tasks (385, 386, and 387) and commitments (382) correspond to task assignments, action items, commitments, or requests made by Boss 381, who is also the sender 312 of email 311 (described in connection to FIG. 3A) to Tom, Jane, and @Room_Reserve (as described in connection to FIGS. 3B and 3I). Accordingly, GUI 308 depicts commitment 382 indicating that Boss committed to sending details to @Room_Reserve. GUI 308 also depicts tasks 385, 386, and 387 indicating tasks assigned to Tom, Jane, and @Room_Reserve, respectfully. These tasks 385, 386, and 387 are determined from and correspond to the sections 326, 327, and 328 of email message 311 that were determined to be directed to Tom, Jane, and @Room_Reserve, respectfully. Further, the determined POV of each recipient of sections 326, 327, and 328 also serves as context to the sender. For example, in task 385, the sender 312 (Boss) is informed that she asked Tom to send the slides. Similarly, in commitment 382 the sender 312 (Boss) is informed that she committed to sending the details specifically to @Room_Reserve, rather than just sending the details generally.

GUI 309 depicts a screenshot of an example daily email briefing 399, which may be generated by a task tracking and reminders management computing application (an example consumer application 290). Example daily email briefing 399 is generated and personalized for M. Boss 391, and corresponds to email 311 with respect to sender 312 (as described in FIG. 3A), which is Boss (the same person). Example daily email briefing 399 includes various reminders including commitment 392 and tasks (or requests) 395, 396, and 397. Commitment 392 corresponds to commitment 382, described in connection with FIG. 3J, and tasks (or requests) 395, 396, and 397 correspond to tasks 385, 386, and 387, also described in connection with described in FIG. 3J.

Continuing with FIG. 2, additional examples of consumer applications 290 comprise improved user-accessibility applications or services. For example, in an electronic communications application, one such user-accessibility service can programmatically identify and surface portions of a communication that are directed to (or relevant to) a user, which may be determined as described in connection with section-recipient(s) determiner 280 or FIGS. 3B, 3C, and 3F. In this way, some embodiments can enable visually impaired users that rely on computer-assisted reading of emails to have those portions of the email that are directed to or relevant to the user prioritized for presentation. For example, these portions may be prioritized by being read by the computer first, by enlarging, highlighting, or otherwise making those portions more apparent to the user. Thus, for example, instead of computer-assisted reading of an entire communication, only portions intended for the user are read, thereby improving computing resource consumption as well as the user's computing experience.

Continuing with FIG. 2, an additional example consumer applications 290 comprises an improved electronic communications computing application, such as an email application having functionality for processing, filtering, or presenting email in a user's inbox according to a determination that the email has sections that are directed to and/or relevant to the user, as a recipient. Accordingly, in an embodiment, a visual indication may be presented in association with an email that indicates the email has at least a section that is intended to the user. Similarly, some embodiments may further indicate the email has at least a section that is directed to the user. In one embodiments, the information about whether an email has at least a section directed to and/or relevant to the user may be stored as metadata for the email. In some embodiments may further include a count of indication of how many sections in the email are directed to and/or relevant to the user, which also may be determined as a ratio, such as section(s) directed to and/or relevant to the user over total number of sections in the email. In this way, the electronic communications application can prioritize, filter, highlight, or further process the recipient's incoming messages based on each message's relevance to the recipient as an intended recipient of portions of the message.

Continuing with FIG. 2, example system 200 includes a presentation component 220 that is generally responsible for presenting any of the aspects of electronic communications and related information as described in connection with section recipient(s) determiner 280, FIGS. 3A-3K, and FIGS. 7 and 8, described below.

Presentation component 220 may comprise one or more applications or services on a user device, across multiple user devices, or in the cloud. For example, in one embodiment, presentation component 220 manages the presentation of messages and message content to a user across multiple user devices associated with that user. Based on information determined by other components of system 200, such as an enhanced communication data or other output of section recipient(s) determiner 280, presentation component 220 may determine aspects of electronic communication content to be presented and/or a context of the presentation, such as how (or in what format and how much content, which can be dependent on the user device or context) it is presented, when it is presented, or other such aspects of presentation.

In some embodiments, presentation component 220 generates user interface features associated with or used to facilitate presenting to the user aspects of enhanced or personalized message content (such as described in connection with FIGS. 3B-3K, 7 and 8). Such features can include interface elements (such as icons or indicators, graphics buttons, sliders, menus, audio prompts, alerts, alarms, vibrations, pop-up windows, notification-bar or status-bar items, in-app notifications, or other similar features for interfacing with a user), queries, and prompts.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes entity extraction logic 233, POV determination logic 235, and mention association logic 237, as described previously, and user profiles 240. One example embodiment of a user profile 240 is illustratively provided in FIG. 2. Example user profile 240 includes information about user accounts and devices 242, communication data 244, recipient-section pairings 246, and user preferences 248. The information stored in user profile 240 may be available to other components of example system 200, in some embodiments.

Various embodiments described herein may access and/or receive a user's email communication or email account (or other type of account or inbox associated with other forms of electronic communications described herein), which may be accessed via user account(s) and devices 242. Accordingly, user accounts and devices 242 generally includes information about user devices accessed, used, or otherwise associated with a user, and/or information related to user accounts associated with the user, for example, online or cloud-based accounts (e.g., email, social media, online meeting applications) such as a Microsoft® Net Passport, other accounts such as entertainment or gaming-related accounts (e.g., Xbox Live, Netflix, online game subscription accounts, etc.), user data relating to accounts such as user emails, texts, instant messages, calls, other communications, and other content; social network accounts and data, such as news feeds; online activity; and calendars, appointments, application data, other user accounts, or the like. Some embodiments of user accounts and devices 242 may store information across one or more databases, knowledge graphs, or data structures.

Communication data 244 is described previously in connection with communication-data collection component 210, mention(s) determiner 250, POV determiner 260, message body parser 270, and section-recipient(s) determiner 280. Recipient-section pairings are described previously in connection with section-recipient(s) determiner 280. User preferences 248 generally include user settings or preferences associated with embodiments described herein including various consumer applications 290. By way of example and not limitation, such settings may include user preferences about the various thresholds described herein, mention-association determination settings by section recipient(s) determiner 280, such as sensitivity, configurations for visual indicators on enhanced email or email summaries as described herein, user-defined definitions used for detecting mentions, or other preferences or configurations for any of the embodiments described herein.

Figure 4:
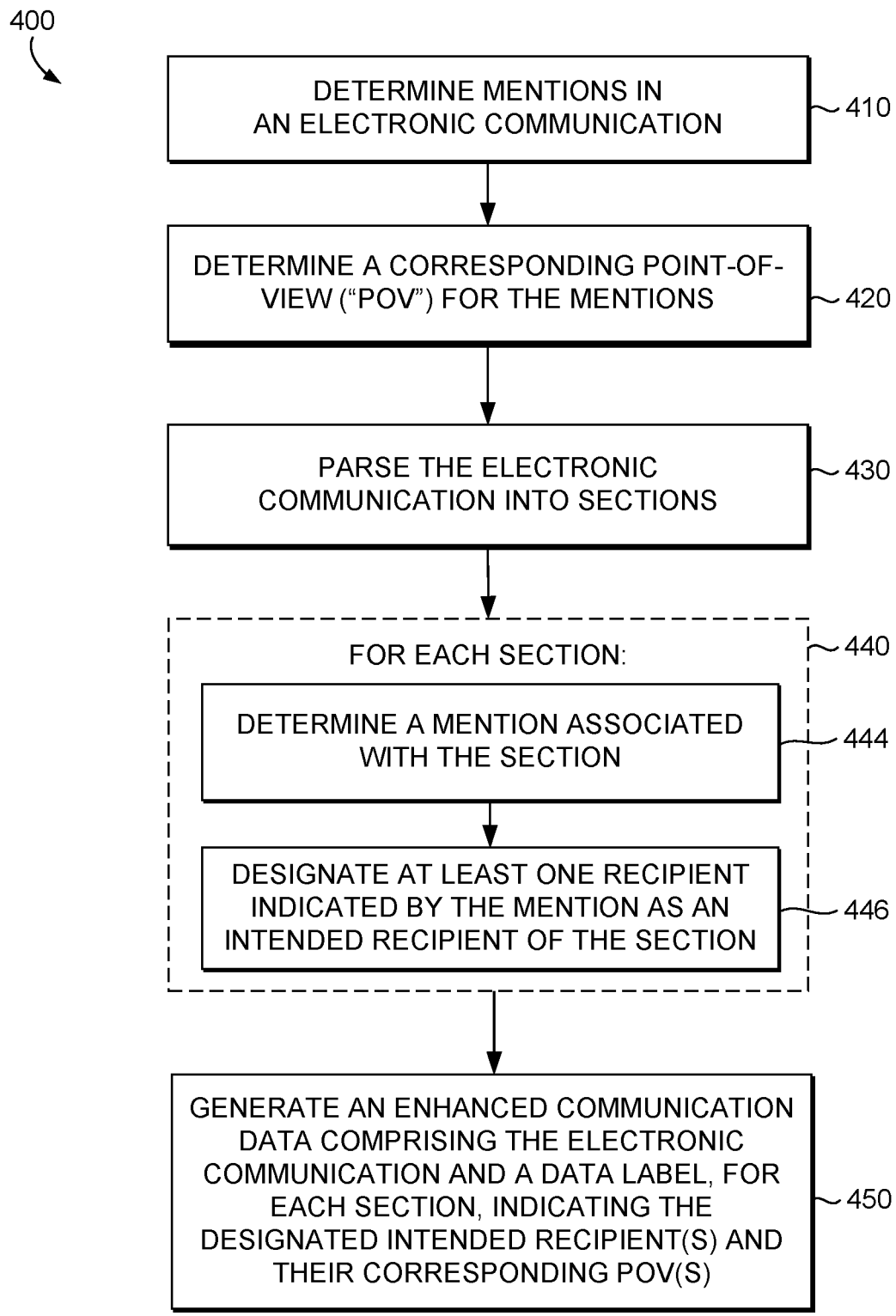
FIGS. 4 and 5 depict flow diagrams of methods for processing electronic communications by user points-of-view, in accordance with an embodiment of the present disclosure.
Figure 5:
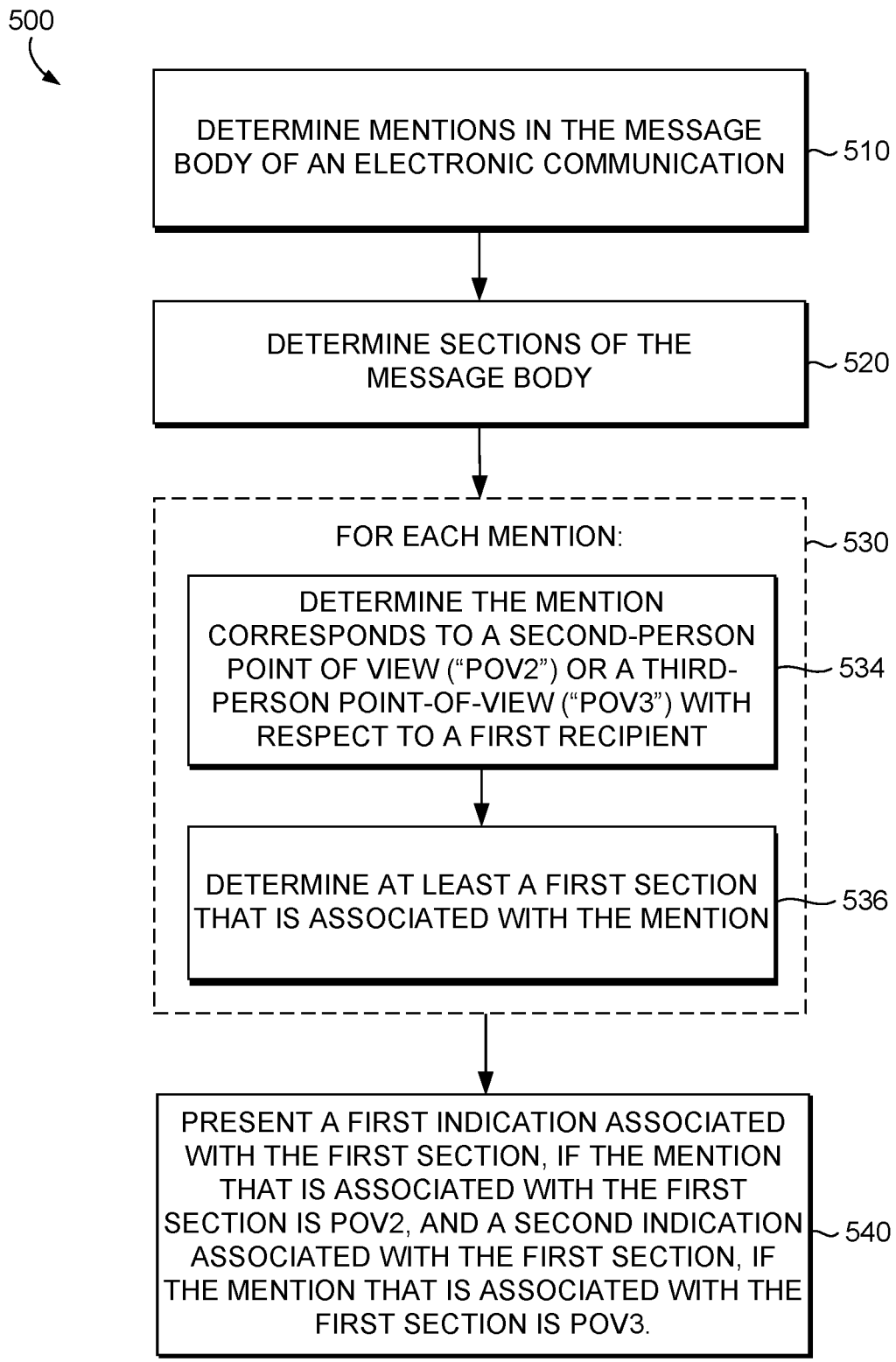

Turning now to FIGS. 4 and 5, aspects of an example process flows 400 and 500 are illustratively depicted for some embodiments of the disclosure. Process flows 400 and 500 each may comprise a method (sometimes referred to herein as method 400 and method 500) that may be carried out to implement various example embodiments described herein. For instance, process flow 400 or process flow 500 may be performed to process electronic communications by user points-of-view to provide any of the improved electronic communications technology or enhanced computing services described herein.

Each block or step of process flow 400, process flow 500, and other methods described herein comprises a computing process that may be performed using any combination of hardware, firmware, and/or software. For instance, various functions may be carried out by a processor executing instructions stored in memory, such as memory 612 described in FIG. 6 or storage 225 described in FIG. 2). The methods may also be embodied as computer-usable instructions stored on computer storage media. The methods may be provided by a stand-alone application, a service or hosted service (stand-alone or in combination with another hosted service), or a plug-in to another product, to name a few. The blocks of process flow 400 and 500 that correspond to actions (or steps) to be performed (as opposed to information to be acted on) may be carried out by one or more computer applications or services, in some embodiments, that may operate on one or more user devices (such as user device 102*a*), servers (such as server 106), may be distributed across multiple user devices and/or servers, or by a distributed computing platform, and/or may be implemented in the cloud. In some embodiments, the functions performed by the blocks or steps of process flows 400 and 500 are carried out by components of system 200, described in connection to FIG. 2.

With reference to FIG. 4, aspects of example process flow 400 for processing electronic communications by user points-of-view is illustratively provided. In particular, example process flow 400 may be performed to generate an enhanced electronic communication, or data that may be used by one or more computing applications or services to provide an improved electronic communications application or enhanced computing service, such as described in connection with consumer application 290 (FIG. 2) and the examples described in connection with FIGS. 3B-3K, and FIG. 8.

At block 410, the method 400 includes determining mentions in an electronic communication. Embodiments of block 410 may determine one or more mentions in an electronic communication, such as an email or meeting transcript. As described previously, a mention may comprise an indication or reference in an electronic communication to at least one user, such as at least one recipient of the electronic communication, which may include a meeting attendee. Thus, for example, embodiments of block 410 may detect one or more mentions occurring in the message body of an email, where each mention corresponds to (or indicates) at least one of the recipients of the email A mention may be implicit or explicit, as described herein, and some mentions indicate or correspond to a plurality of recipients.

Some embodiments of block 410 utilize one or more entity extraction models or entity extraction logic, such as entity extraction logic 233 described in connection with FIG. 2, to detect a mention in the message body, and/or determine a recipient corresponding to the mention. For example, one embodiment uses named-entity recognition (NER) logic for performing named entity identification, entity chunking, and/or named entity extraction. Some embodiments of block 410 may utilize communication-related data, which may include communication metadata, such as a distribution list, related communications (e.g., in a thread), or org chart, to identify a recipient or a potential recipient based on a detected mention. Accordingly in some embodiments, entity extraction logic 233 may include instructions for using communication metadata, such as a distribution list, related communications (e.g., in a thread), or org chart, to identify a recipient or a potential recipient based on a detected mention. Further, some embodiments of block 410 comprise determining one or more recipients of an electronic communication and then using that the one or more recipients to determine the recipient(s) most likely indicated or corresponding to a mention.

In some embodiments of block 410, only mentions that correspond to a particular recipient, which may include mentions to a group, such as a distribution list, to which the recipient is a member, are determined. For example and as further described herein, some embodiments may operate on (or partially operate on) a user computing device (for example, a user device) associated with a particular user, or may operate on (or partially operate on) a server in connection to an account associated with the particular user. Thus for example, the mentions with respect to a particular recipient may be detected in block 410 and used to provide an enhanced electronic communication to the recipient, such as by presenting visual indicators associated with an electronic communication to indicate sections of the message body that are directed to the recipient. Some embodiments of block 410 may be carried out using a mention(s) determiner 250 (FIG. 2). Additional details of embodiments of block 410, or for carrying out operations of block 410, are described in connection to FIG. 2, and in particular mention(s) determiner 250.

The method 400 continues at block 420 by determining a corresponding POV for the mentions in an electronic communication. Embodiments of block 420 determine a POV for one or more of the mentions that may be determined in block 410. In particular, as each mention indicates or corresponds to a recipient, a POV for the mention may be determined to be a second-person POV (POV2) or a third-person POV (POV3). Thus a particular mention may be determined to be POV2 or POV3, with regards to the context of the message in which the mention occurs. For example, for the message section, "Tom, please send the file to Jane," which has a mention for Tom and a mention for Jane, the mention for Tom may be determined to have a POV2 and the mention for Jane to have a POV3, as further described herein, and in particular as described in connection with POV determiner 260 in FIG. 2.

Some embodiments of block 420 may utilize POV determination logic which may include one or more POV models, such as POV determination logic 235 described in connection with FIG. 2. Further, the POV determination logic may include instructions for utilizing one or more features associated with or characterizing a mention to determine a POV for the mention, which may be determined or extracted from the electronic communication or related information, such as communication-related data. For example, in an embodiment, block 420 uses information about n words (such as three words) of a message body occurring before and/or after a mention to determine a likely POV of the mention. Embodiments of block 420 may be carried out using a POV determiner 260 (FIG. 2). Additional details of embodiments of block 420, or for carrying out operations of block 420, are described in connection to FIG. 2, and in particular POV determiner 260.

At block 430, the electronic communication is parsed into one or more sections. In particular, embodiments of block 430 may partition or divide a message body of an electronic communication into one or more sections. As described herein, a section may comprise at least a portion of the message body. Some embodiments of block 430 may determine or more logical partitions of a message body, so that the message remains intact, but such that each portion or section can be identified. In some embodiments, each section is non-overlapping. In other embodiments, sections may be overlapping, or sections may have subsections, as further described herein. For example, a section may comprise a sentence, paragraph, or portion of a message body.

Embodiments of block 430 may determine the one or more sections by using parser logic and/or one or more rules and features of an electronic communication, such as grammar, carriage returns, punctuation, indentation, spacing, formatting, subject matter similarity or other similarity logic, or other features of a message body. Block 430 may, in some embodiments, provide information indicating the sections, such as labeling sections with a section identifier or ID (e.g., section01, section02, etc.). In some embodiments, block 430 generates a map or index of thee section identifiers (or indications of the sections or identifier) to the message body, as described herein. Some embodiments of block 430 may be carried out using a message body parser 270 (FIG. 2). Additional details of embodiments of block 430, or for carrying out operations of block 430, are described in connection to FIG. 2, and in particular message body parser 270.

At block 440 of method 400, operations may be performed for each section (or for at least one section) of the electronic communication. The operations of block 440 include sub-blocks 444 and 446. At sub-block 444, for each section (or for at least one section) of the electronic communication, one or more mentions associated with the section may be determined. Thus in some embodiments of sub-block 444, a plurality of mentions associated with the section may be determined. Alternatively, some embodiments of sub-block 444 may determine one or more sections associated with a mention.

Some embodiments of sub-block 444 include using mention association logic, such as mention association logic 237, described in connection with FIG. 2, to determine a that a mention is associated with a section (or correspondingly, to determine that a section is associated with a mention). For example and as further described herein, mention association logic may include instructions including rules and/or conditions, or other logic such as described in connection with mention association logic 237. In particular, according to some embodiments, a mention may be determined to be associated with a section if it is determined that the mention occurs within the section. If the mention does not occur within the section, and the section does not include another mention, then some embodiments may determine the mention to be associated with the section, if the mention is closer to the section than other mentions in the message body, or in alternative embodiments, the closet mention occurring in the message body prior to the section may be considered to be associated with the section. If the section does not include any mentions, then some embodiments of mention association logic 237 may determine whether the section is contextually similar or relevant to another section that has a mention associated therewith. For example, if a first section does not have a mention, but is determined to have a similar topic or words occurring in a second section, and the second section has a mention within it, then that mention within the second section may be determined to be associated with the first section, according to some embodiments. Additional details for determining an association are described in connection with mention association logic 237 and section recipient(s) determiner 280 of FIG. 2. In some embodiments, sub-block 444 further determines a confidence regarding an association between a mention and a section, as described herein, which may indicate a likelihood or probability that the mention is associated with the section.

Continuing with block 440, at sub-block 446, for each mention determined to be associated with a section, designate at least one recipient indicated by the mention as an intended recipient of the section. Embodiments of sub-block 446 may determine one or more intended recipients for a section of an electronic communication based, at least in part, one or more mentions associated with the section, which may be determined in sub-block 444. As described previously, an intended recipient of a section of an electronic communication is a recipient for which the section is relevant, which may further comprise a recipient for which the author of the communication (e.g., the sender of an email) intends the section to be for.

Some embodiments of sub-block 446 may determine an intended recipient of a section based on the POV corresponding to mention that is associated with the section and that indicates or corresponds to a particular recipient (or a plurality of recipients). For example, in some implementations, only mentions associated with a section that are determined to have a second-person POV (POV2) are designated as the intended recipients of the section. Or alternatively, only mentions associated with a section that are determined to have a third-person POV (POV3) are designated as the intended recipients of the section.

In some instances a section may be considered to be directed to a particular intended recipient or merely relevant to a particular intended recipient. For example, in some embodiments of sub-block 446, a section may be considered directed to the intended recipient if the POV for a recipient's mention associated with the section is POV2, and the section may be considered relevant to the intended recipient if the POV for the recipient's mention associated with the section is POV3. Further, some embodiments of sub-block 446 may designate an intended recipient as a POV2 intended recipient, if the POV corresponding to the mention indicating the recipient, is determined as POV2, and/or may designate an intended recipient as a POV3 intended recipient if the POV corresponding to the first mention is determined as the POV3.

Some embodiments of block 440, or sub-blocks 444 and/or 446 may be performed by a section recipient(s) determiner, such as section recipient(s) determiner 280 (FIG. 2) and/or using mention association logic, such as mention association logic 237 (FIG. 2). Additional details of embodiments of block 440 and its sub-blocks, or for carrying out operations of block 440, or its sub-blocks, are described in connection to FIG. 2, and in particular section recipient(s) determiner 280.

The method 400 continues at block 450 by generating an enhanced electronic communication data comprising the electronic communication and a data label, for each section (or for at least one section) indicating the designated intended recipient(s) and their corresponding POVs. In particular, embodiments of block 450 may generate an enhanced electronic communication data that includes at least one data label corresponding to a section of the electronic communication, which may be determined in block 430. The data label may comprise a label, tag, markup, annotation, pointer, reference, indicium, record or table entry, or similar label or identifier corresponding to the section, such as described herein. The data label may indicate at least one intended recipient for the section, which may be determined, in some embodiments of method 400, from block 410 and block 440. In some embodiments of block 450, the data label generated as part of the enhanced electronic communication data further indicates the POV of the mention that indicates the intended recipient and that is associated with the section corresponding to the label.

Some embodiments of block 450 further comprise storing the enhanced electronic communication data in a record associated with the electronic communication and/or making at least a portion of the enhanced electronic communication data available to one or more consumer computing applications or services, such as consumer applications 290, described in connection with FIG. 2, or the example consumer applications 290 described in connection with FIGS. 3B-3K.

For example, in one embodiment, a portion of the enhanced electronic communication data generated at block 450 may be used to present an indication associated with a section of the electronic communication corresponding to a data label. The indication may indicate an intended recipient of the section and/or the POV corresponding to the intended recipient. For example, in some embodiments, the indication may comprise a highlight, color, shading, label, boldface text, or visual marking that may be presented on a user device via a GUI associated with an electronic communications application or a computer application or service. In some embodiments, the indication may be specific to a particular recipient, for example, by presenting an enhanced electronic communication showing sections that are directed to the recipient, as POV2 and sections that are relevant to the recipient, as POV3. Additional details of this example and similar examples of using a portion of the enhanced electronic communication to present an indication associated with a section of the electronic communication are described in connection with FIGS. 3C and 3F.

In another example embodiment, a portion of the enhanced electronic communication data generated at block 450 may be used to generate a suggested reply, such as described in connection with FIGS. 3D and 3G. In still another example embodiment, a portion of the enhanced electronic communication data generated at block 450 may be used to generate a summary of the electronic communication or to modify the electronic communication to be personalized to a particular recipient, such as described in connection with FIGS. 3E and 3H. Additional examples of using a portion of the enhanced electronic communication data generated at block 450 to provide an improved electronic communications technology or enhanced computing services are described in connection with consumer applications 290 for enhanced communications data of FIG. 2, and the examples described in FIGS. 3A-3K, and FIG. 8.

Some embodiments of block 450 may be performed or facilitated by a section recipient(s) determiner, such as section recipient(s) determiner 280 (FIG. 2), and/or by one or more consumer applications 290 for enhanced communications data (FIG. 2) Additional details of embodiments of block 450, or for carrying out operations of block 450, are described in connection to FIG. 2, and in particular section recipient(s) determiner 280 and consumer applications 290, and in FIGS. 3A-3K, and 8.

With reference to FIG. 5, aspects of example process flow 500 for processing electronic communications by user points-of-view is illustratively provided. At a high level, example process flow 500 may be performed to determine and cause to be presented an indication, such as a visual indication, associated with a section of an electronic communication. In some embodiments of process flow 500, the indication may indicate to a recipient of the electronic communication that the section is directed to them (for example, as POV2), or the section is merely relevant to them (for example, as POV3).

Accordingly, at block 510, the method 500 includes determining mentions in a message body of an electronic communication. Embodiments of block 510 may determine one or more mentions in an electronic communication having a message body, such as an email or meeting transcript, where each mention corresponds to (or indicates) at least one of the recipients (or attendees) of the electronic communication. A particular mention determined at block 510 may be implicit or explicit, as described herein, and some mentions indicate or correspond to a plurality of recipients. Further, some embodiments of block 510 utilize one or more entity extraction models or entity extraction logic, such as entity extraction logic 233 described in connection with FIG. 2, which may include computer instructions for using communication metadata, such as a distribution list, related communications (e.g., in a thread), or org chart, to identify a recipient or a potential recipient based on a detected mention. In some embodiments of block 510, one or more recipients of the electronic communication may be determined and then used to determine the recipient(s) most likely indicated or corresponding to a mention.

Some embodiments of block 510 may be implemented as an embodiment of block 410 (process flow 400). Some embodiments of block 510 may be carried out using a mention(s) determiner 250 (FIG. 2). Additional details of embodiments of block 510, or for carrying out operations of block 510, are described in connection to FIG. 2, and in particular mention(s) determiner 250.

The method 500 continues at block 520 by determining sections of the message body. In particular, embodiments of block 510 may determine one or more sections of the message body of the electronic communication. For example, some embodiments of block 520 may parse the message body into one or more sections, which may comprise logical partitions of a message body, so that the message remains intact, but such that each portion or section can be identified. For instance, a section may comprise a sentence, paragraph, or portion of a message body. Some embodiments of block 520 may determine the one or more sections by using parser logic and/or one or more rules and features of an electronic communication, such as described in block 430 of process flow 400, and further, some embodiments of block 520 may be implemented as an embodiment of block 430. Embodiments of block 520 may be carried out using a message body parser 270 (FIG. 2), in some embodiments. Additional details of embodiments of block 520, or for carrying out operations of block 420, are described in connection to FIG. 2, and in particular message body parser 270.

At block 530, method 500, operations may be performed for each mention (or for at least one mention) of the message body, which may be determined from block 510. The operations of block 530 include sub-blocks 534 and 536. At sub-block 534, for each mention (or for at least one mention) of the message body, it is determined whether the mention corresponds to a POV2 or a POV3 with respect to a first recipient indicated by the mention. For example, as described herein, a particular mention may be determined to be POV2 or POV3, with regards to the context of the message in which the mention occurs. For example, for the message section, "Tom, please send the file to Jane," the mention for Tom may be determined to have a POV2, in connection with POV determiner 260 in FIG. 2.

Some embodiments of sub-block 534 may utilize POV determination logic which may include one or more POV models, such as POV determination logic 235 described in connection with FIG. 2 and with block 420 of process flow 400. Further, some embodiments of sub-block 534 may be implemented as an embodiment of block 420. Some embodiments of block sub-block 534 may be carried out using POV determiner 260 (FIG. 2). Additional details of embodiments of sub-block 534, or for carrying out operations of sub-block 534, are described in connection to FIG. 2, and in particular POV determiner 260.

Continuing with block 530, at sub-block 536, for each mention (or for at least one mention) of the message body, determine at least a first section that is associated with the mention. Embodiments of sub-block 536 may determine one or more sections, from among the sections determined at block 520, that are associated with each mention (or at least one mention) of the message body, determined at block 510. Thus in some embodiments of sub-block 536, a plurality of sections associated with a mention may be determined.

Some embodiments of sub-block 536 include using mention association logic to determine that a section is associated with a mention, such as described in connection with mention association logic 237 of FIG. 2 and with sub-block 444 of process flow 400. Further, some embodiments of sub-block 536 may be implemented as an embodiment of sub-block 444. Some embodiments of sub-block 536 may be performed by a section recipient(s) determiner, such as section recipient(s) determiner 280 (FIG. 2). Some embodiments of sub-block 536, or block 530, may further include generating an enhanced electronic communication data, such as described in connection with block 450 of process flow 400. Additional details of embodiments of sub-block 536, or for carrying out operations of sub-block 536, are described in connection to FIG. 2, and in particular section recipient(s) determiner 280.

At block 540 of process flow 500, a first indication, associated with at least the first section, may be presented, if the mention that is associated with the first section is POV2, and a second indication, associated with at least the first section, may be presented if the mention that is associated with the first section is POV3. In particular, embodiments of block 540 may present a first or a second indication, based on whether the mention determined, in sub-block 536, to be associated with the first section is POV2 or POV3 with respect to the first recipient. The indication may be presented, for example, via on a user device via a user interface associated with an electronic communications application or a computer application or service, such as an audio presentation or visual presentation via a GUI. For example, the first indication may comprise a visual indicator that the first section is directed to the first recipient, as the first indication is presented if the mention to the first recipient in the first section is determined as a POV2. Similarly, the second indication also may comprise a visual indicator that the first section is relevant to, but not directed to, the first recipient, as the second indication is presented if the mention to the first recipient in the first section is determined as a POV3. In some embodiments of block 540, the first and second visual indicators, may comprise visual indicators, such as a highlight, color, shading, label, boldface text, or visual marking, such as the visual indicators described in connection with FIGS. 3C and 3F.

In some embodiments of block 540, the first and second visual indicators, may comprise a first and second suggested reply, respectively, which may be generated at block 540 or as part of an additional step of process flow 500 (not shown). In particular, in some embodiments, the first suggested reply is generated to be from the first recipient and responds to at least the first section in the message body. Further, the first suggested reply may be generated according to the POV2 of the first recipient in the first section. Similarly, in some embodiments, the second suggested reply is generated to be from the first recipient and also responds to at least the first section in the message body. But the second suggested reply is generated according to the POV3 of the first recipient in the first section, and thus is different than the first suggested reply. Additional details of embodiments of generating suggested replies in block 540 or process flow 500 are described in connection with consumer applications 290 of FIG. 2, and FIGS. 3D and 3G. Some embodiments of block 540 may be performed by a consumer application 290 for enhanced communication data, in FIG. 2. Additional details of embodiments of block 540, or for carrying out operations of block 540, are described in connection with consumer application 290 of FIG. 2, and the example consumer applications 290 described in connection with FIGS. 3B-3K, and FIG. 8.

Figure 7:
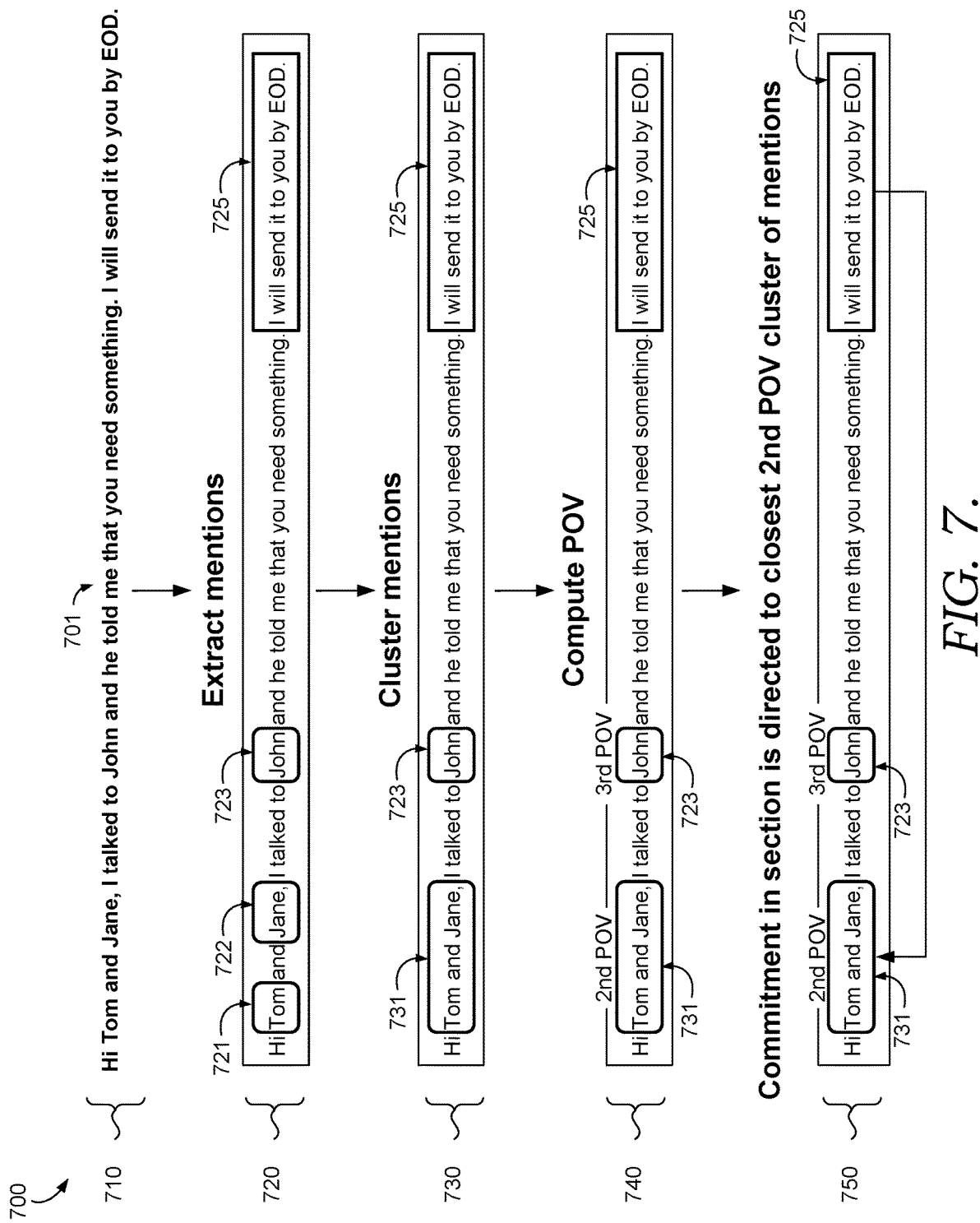
FIG. 7 depicts aspects of an example process flow for processing an email message according to mention POVs, in accordance with an embodiment of the present disclosure.

Turning to FIG. 7, and with reference to FIG. 2, aspects of an example process flow 700 for processing an email according to POV of mentions in the email is illustratively provided. Starting at step 710, an example message section 701 of the message body in an electronic communication is provided. Message section 701 may be one section in a message body that has multiple sections, or may comprise the entirety of the message body. In this example, message section 701 includes the text, Hi Tom and Jane, I talked to John and he told me that you need something. I will send it to you by EOD.

At a step 720, process flow 700 extracts mentions from the message section 701. In particular, embodiments of step 720 extract (or determine) mentions in the message body, or section of the message body. Here, three mentions are detected and extracted: mention 721 to Tom, mention 722 to Jane, and mention 723 to John. Some embodiments of step 720 may be performed using entity extraction logic 233 or an entity extraction model, as described herein. Some embodiments of step 720 may be performed as described in connection with block 410 of process flow 400, and/or may be carried out by mention(s) determiner 250 of FIG. 2. Additional details of embodiments of step 720, or for carrying out operations of step 720, are described in connection to FIG. 2, and in particular section mention(s) determiner 250.

Step 720 further includes detecting, and/or extracting a commitment 725 in message section 701. A commitment, or request, or task, may be determined using an entity extraction model (not shown), such as a task extraction model or commitment extraction model. Here, commitment 725 comprises a commitment by the sender of the electronic commination indicating, I will send it to you by EOD.

At a step 730, process flow 700 performs a clustering operation to cluster mentions. In particular, as described herein in connection with mention(s) determiner 250 and POV determination logic 235, some embodiments may determine clusters of mentions, which may comprise two or more mentions detected together or near each other in a message. Here, a cluster 731 of mentions 721 and 722 is determined. Additional details of embodiments of step 730, or for carrying out operations of step 730, are described in connection to FIG. 2, and in particular section mention(s) determiner 250 and POV determination logic 235.

At a step 740, process flow 700 computes the POV for the mention 723, and cluster 731 of mentions 721 and 722. Here, cluster 731 is determined to have a POV2 with respect to Tom and Jane, and mention 723 is determined to have a POV3 with respect to John. Some embodiments of step 740 may be performed using POV determination logic 235, as described in connection with FIG. 2. Some embodiments of step 740 may be performed as described in connection with block 420 of process flow 400, and/or may be carried out by POV determiner 260 of FIG. 2. Additional details of embodiments of step 740, or for carrying out operations of step 740, are described in connection to FIG. 2, and in particular POV determiner 260 and POV determination logic 235.

At a step 750, the commitment 725 detected in step 720 is determined to be directed to the recipients indicated in cluster 731. More specifically, embodiments of step 750 may comprise determining that the mentions, including cluster 731 and mention 723, are the intended recipients of the message section 701. Embodiments of step 750 may further determine that the message section 701 is directed to the mentions having a corresponding POV2, which is the cluster 731. Thus, message section 701 is directed to Tom and Jane, as the POV2 intended recipients. Accordingly, the commitment 725 is also directed to Tom and Jane, as POV2 recipients, since the commitment 725 is within the message section 701. In particular, by processing message section 701 according to a POV of the recipients, it can be determined that message section 701 is directed to Tom and Jane, and thus the commitment is to Tom and Jane. Similarly, if message section 701 includes a task, then Tom and Jane, as POV2 intended recipients, would be responsible for carrying out the task. Additional details of embodiments of step 750 are described in connection with FIGS. 3I-3K.

Figure 8:
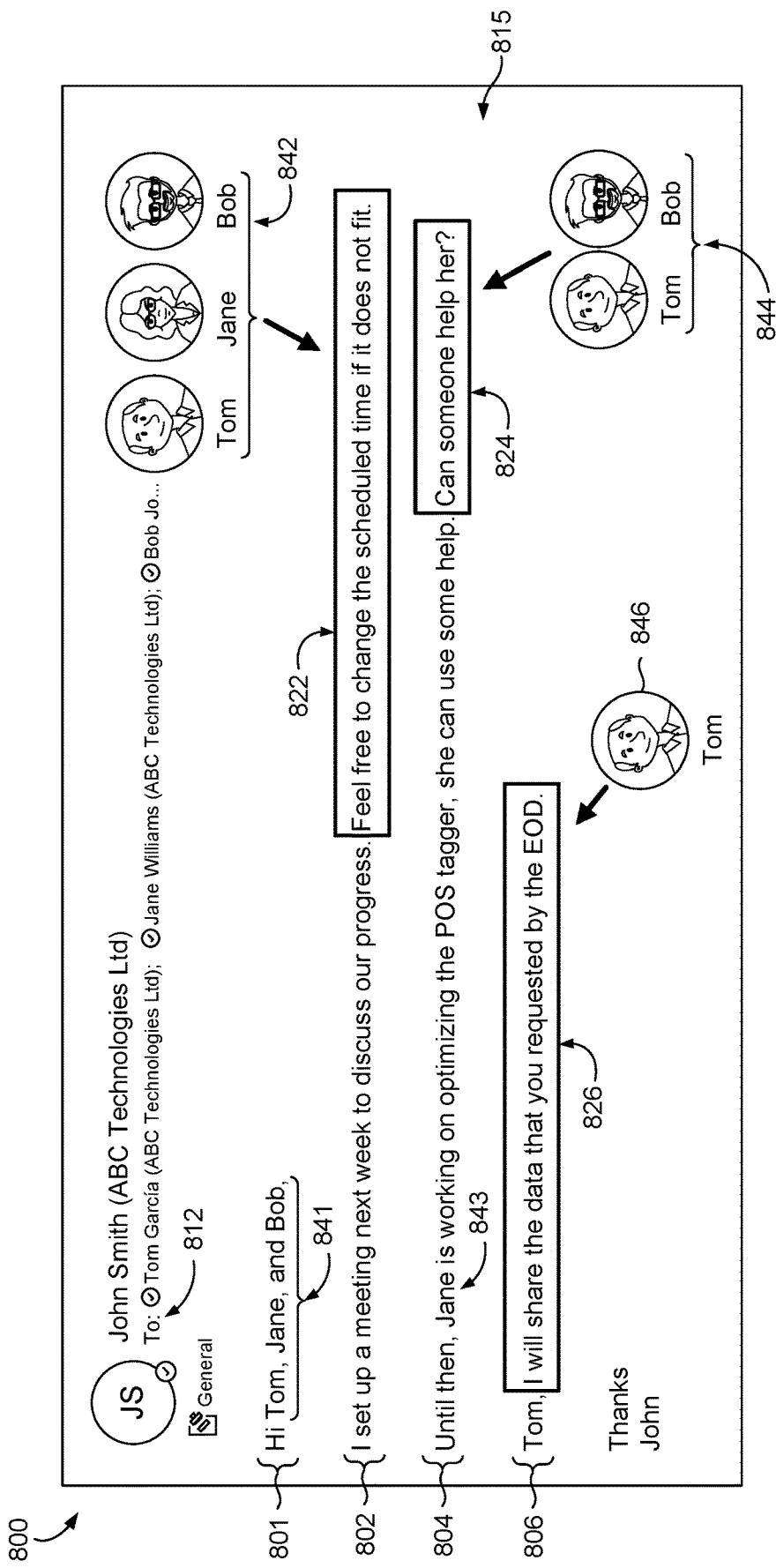
FIG. 8 illustratively depicts aspects of one example email message processed according to an embodiment of the present disclosure to determine sections having commitments and tasks, and to determine mentions associated with those sections with corresponding POVs of the mentions.

Turning now to FIG. 8, and with continuing reference to FIG. 2, aspects are illustratively provided of an example email 800 that is processed according to the points of view for recipients that are associated with portions of the electronic communication. In particular, example email 800 has been processed, according to an embodiment described herein, to determine sections 801, 802, 804, and 806, having various commitments and tasks 822, 824, and 826, and to determine mentions 842, 844, and 846 associated with those sections with corresponding POVs of the mentions.

According to one embodiment, email 800 may be processed to determine mentions 842, 844, and 846 in the message body 815, as described in connection with mention(s) determiner 250. Example email 800 is sent to the recipients identified in item 812 including Tom, Jane, and Bob, so Tom, Jane, and Bob may be identified as the example recipients of email 800. Further, a POV may be determined for each mention, as described in connection with POV determiner 260. Email 800 may be parsed into sections 801, 802, 804, and 806 as described by message body parser 270. In this example, email 800 also may be processed to determine commitments and tasks 822, 824, and 826, which may be determined using a task extraction model or commitment extraction model, such as described in connection with FIG. 7.

Finally, as described in connection with section-recipient(s) 280, one or more intended recipients may be determined for each section of email 800, and it may be determined further whether a particular section is directed to one or more of the recipients, as a POV2, or merely relevant to one or more of the recipients, as a POV3. Thus, it may be determined that section 802 is intended for Tom, Jane, and Bob because, as described in connection with section-recipient(s) 280, and specifically mention association logic 237, section 802 does not include any mentions, but the previous section 801 includes mentions 841 to Tom, Jane, and Bob, with corresponding POV2. Thus, according to an embodiment, section 802 may be determined to be intended for Tom, Jane, and Bob, because Tom, Jane, and Bob are POV2 recipients of the mentions that are determined to be associated with section 802. Accordingly, as task 822 occurs within section 802, it may be determined that task 822 is directed to Tom, Jane, and Bob, because their POV for section 802 is POV2.

Similarly, section 804 may be determined to be intended for Tom, Jane, and Bob, because although Jane is mentioned at mention 843, the mention 843 is POV3. Section 804 is therefore relevant to Jane, as a POV3 mention. Section 804 does not include explicit mentions to Tom and Bob, but the mentions 841 to Tom and Bob in section 801 were determined to be associated with section 802, as POV2 intended recipients, and section 802 precedes section 804. Thus according to an embodiment, the POV2 mentions 841 to Tom and Bob carry into section 804, and thus Tom and Bob are intended recipients of section 804. Further, section 804 is directed to Tom and Bob, because their mentions 844 have a POV2. Accordingly, as task 824 occurs within section 804, it may be determined that task 824 is directed to Tom and Bob, because their POV for section 804 is POV2.

Similarly, still section 806 may be determined to be intended for Tom because Tom is explicitly mentioned in section 806. It may be further determined, such as by using POV determination logic 235, that the mention to Tom is POV2, because section 806 is directed to Tom. Accordingly, as commitment 826 occurs within section 806, it may be determined that commitment 826 is directed to Tom because the mention to Tom, in section 806, is a POV2.

Accordingly, we have described various aspects of technology directed to systems and methods for providing improved electronic communications technology and enhanced computing services on personal computing devices by processing electronic communications by user points-of-view. It is understood that various features, sub-combinations, and modifications of the embodiments described herein are of utility and may be employed in other embodiments without reference to other features or sub-combinations. Moreover, the order and sequences of steps shown in the example process flows 400 and 500 are not meant to limit the scope of the present disclosure in any way, and in fact, the steps may occur in a variety of different sequences within embodiments hereof. Such variations and combinations thereof are also contemplated to be within the scope of embodiments of this disclosure.

Other Embodiments

As described herein, various embodiments may be employed to process electronic communications according to user points of view. In some embodiments, a computing system is provided comprising at least one processor and computer memory having computer-readable instructions embodied thereon that when executed by the at least one processor cause the computing system to perform operations. The operations include detecting one or more mentions in an electronic communication, each mention indicating at least one user associated with the electronic communication. The operations further include, for each of the one or more mentions, programmatically determining a corresponding point of view ("POV") for the mention. The operations further include programmatically parsing the electronic communication into one or more sections. The operations further include, for a first section of the one or more sections: determining a first mention, from the one or more mentions, that is associated with the first section; and designating the at least one user, indicated by the first mention, as an intended recipient of the first section. The operations further include generating an enhanced electronic communication data comprising the electronic communication and a data label corresponding to the first section, the data label indicating the intended recipient of the first section and further indicating the POV corresponding to the first mention of the first section. The operations further include storing the enhanced electronic communication data in an electronic record associated with the electronic communication. Advantageously, by processing an electronic communication by user points of view in this way, computing systems for electronic communications are made more efficient, network bandwidth consumption is reduced, as fewer messages may require responding to by a user or opening and reading, improved control over the presentation or display of electronic communications on computing devices is provided, and/or computer resource consumption is reduced.

In any combination of the above embodiments, the determined corresponding POV is determined as a second-person POV ("POV2") or a third-person POV ("POV3").

In any combination of the above embodiments, causing to present a first indication associated with the first section of the electronic communication that indicates the POV corresponding to the first mention of the first section based on the data label corresponding to the first section.

In any combination of the above embodiments, the first indication comprises a highlight, color, shading, label, boldface text, or visual marking.

In any combination of the above embodiments, designating the at least one user, indicated by the first mention, as the intended recipient of the first section further comprises: designating the intended recipient as a POV2 intended recipient if the POV corresponding to the first mention is determined as the POV2; and designating the intended recipient as a POV3 intended recipient if the POV corresponding to the first mention is determined as the POV3.

In any combination of the above embodiments, generating a first suggested reply for the intended recipient, responding to at least the first section, if the POV corresponding to the first mention is determined as the POV2, and generating a second suggested reply for the intended recipient, responding to at least the first section, if the POV corresponding to the first mention is determined as the POV3.

In any combination of the above embodiments, the first suggested reply is generated based on the POV2 and the second suggested reply is generated based on the POV3.

In any combination of the above embodiments the POV2 intended recipient designation indicates the first section is directed to the at least one user, and the POV3 intended recipient designation indicates the first section is relevant to the at least one user.

In any combination of the above embodiments, if the data label corresponding to the first section indicates the POV2, then determining a responsible task to be performed by the first recipient based on the first section; and if the data label corresponding to the first section indicates the POV3, then determining a relevant task that is associated with the first recipient based on the first section; and providing an indication of the responsible task or an indication of the relevant task to a computer application for task tracking.

In any combination of the above embodiments, the first mention indicates a plurality of users associated with the electronic communication, and the plurality of users is designated as the intended recipient of the first section; and at least one mention of the one or more mentions comprises an implicit mention.

In any combination of the above embodiments, detecting the one or more mentions in the electronic communication comprises: if the electronic communication is an email, determining for each mention that the at least one user indicated by the mention is a recipient of the email, or if the electronic communication is a meeting transcription, determining for each mention that the at least one user indicated by the mention is a meeting attendee; and wherein an entity extraction model is used to detect the one or more mentions.

In any combination of the above embodiments, the first mention is determined to be associated with the first section based on a determination of at least one of the following conditions: the first mention is within the first section; the first section does not include the first mention and does not include a second mention, of the one or more mentions, and the first section is closer to the first mention than the second mention; and the first section does not include the first mention and does not include the second mention, the first section has a contextual similarity to a second section, and the first mention is within the second section.

In any combination of the above embodiments, storing as labeled training data, in a database configured for use to train a machine learning model, at least a portion of the enhanced electronic communication data.

In some embodiments, a computer-implemented method is provided for providing a personalized computing experience in a communications application that is a computer program operating on at least one computing device. The method may include, for an electronic communication having a message body and at least a first recipient, determining one or more mentions in the message body, each mention indicating at least one recipient of the electronic communication. The method further includes determining one or more sections of the message body. The method further includes, for a first mention, of the one or more mentions: determining that the first mention corresponds to a second-person point of view ("POV2") or a third-person point of view ("POV3") with respect to the first recipient; and determining at least a first section, of the one or more sections, that is associated with the first mention. The method further includes causing to present, via the communications application, a first indication associated with the first section, if the first mention corresponds to a POV2, and a second indication associated with the first section, if the first mention corresponds to a POV3. Advantageously, by processing an electronic communication by user points of view in this way, computing systems for electronic communications are made more efficient, network bandwidth consumption is reduced, as fewer messages may require responding to by a user or opening and reading, improved control over the presentation or display of electronic communications on computing devices is provided, and/or computer resource consumption is reduced.

In any combination of the above embodiments, the first mention corresponds to a POV2, and, for a second mention, of the one or more mentions: determining that the second mention corresponds to a POV3 with respect to the first recipient, and determining at least a second section, of the one or more sections, that is associated with the second mention; and causing to present, via the communications application, a third indication associated with the second section, the third indication being different than the first indication.

In any combination of the above embodiments, the first indication comprises a first color, a first highlight, a first shading, or a first visual indication, and the third indication comprises a second color that is different than the first color, a second highlight that is different than the first highlight, a second shading that is different than the first shading, or a second visual indication that is different than the first visual indication.

In any combination of the above embodiments, if the first mention corresponds to the POV2, based on the POV2, generating a first suggested reply for the first recipient, responding to at least the first section, and wherein the first indication comprises the first suggested reply; and if the first mention corresponds to the POV3, based on the POV3, generating a second suggested reply for the first recipient, responding to at least the first section, wherein the second indication comprises the second suggested reply; and wherein the first suggested reply is different than the second suggested reply.

In any combination of the above embodiments, determining at least one section, of the one or more sections, that is not associated with the first mention; modifying the message body of the electronic communication to omit the at least one section that is not associated with the first mention, thereby forming a modified message body; and causing the modified message body to be presented via the communications application.

In any combination of the above embodiments, the first section is determined to be associated with the first mention based on at least one of the following determinations: the first section includes the first mention; the message body includes a second mention corresponding to a second recipient, the first section does not include the first mention or the second mention, and the first mention occurs, in the message body, closer to the first section than the occurrence of the second mention in the message body; or the message body includes the second mention corresponding to the second recipient, the first section does not include the first mention or the second mention, the first section has a contextual similarity to a second section, of the one or more sections, and the second section includes the first mention.

In some embodiments, one or more computer storage media, excluding signals per se, having computer-executable instructions embodied thereon that when executed by at least one computer processor, cause the at least one computer processor to perform operations. The operations may include receiving electronic communication data comprising a message body and metadata indicating one or more recipients of the electronic communication. The operations further include determining one or more mentions in the message body, each mention referring to at least one recipient, of the one or more recipients of the electronic communication. The operations further include, for each mention, determining a corresponding point of view (POV) for the mention that comprises a second-person POV ("POV2") or a third-person POV ("POV3"). The operations further include parsing the message body into one or more sections comprising at least a first section. The operations further include, for the first section having at least one mention associated therewith: determining each mention, of the one or more mentions, that is associated with the first section; and based on the POV corresponding to each mention that is associate with the first section, determining a set of intended recipients of the first section comprising the at least one recipient referred to by each of the mentions associated with the first section. The operations further include based on set of intended recipients of the first section, providing an enhanced computing experience. Advantageously, by processing an electronic communication by user points of view in this way, computing systems for electronic communications are made more efficient, network bandwidth consumption is reduced, as fewer messages may require responding to by a user or opening and reading, improved control over the presentation or display of electronic communications on computing devices is provided, and/or computer resource consumption is reduced.

In any combination of the above embodiments the enhanced computing experience comprises at least one of: for a first intended recipient of the set of intended recipients, causing a presentation of the message body with a first visual indication if the POV corresponding to a mention that refers to the first intended recipient is the POV2, and causing the presentation of the message body with a second visual indication if the POV corresponding to the mention that refers to the first intended recipient is the POV3; and for the first intended recipient of the set of intended recipients, generating a first suggested reply for the first intended recipient, responding to at least the first section, if the POV corresponding to a mention that refers to the first intended recipient is the POV2, and generating a second suggested reply, for the first intended recipient, responding to at least the first section, if the POV corresponding to a mention that refers to the first intended recipient is the POV3, wherein the second suggested reply is different than the first suggested reply.

Overview of Exemplary Operating Environment

Figure 6:
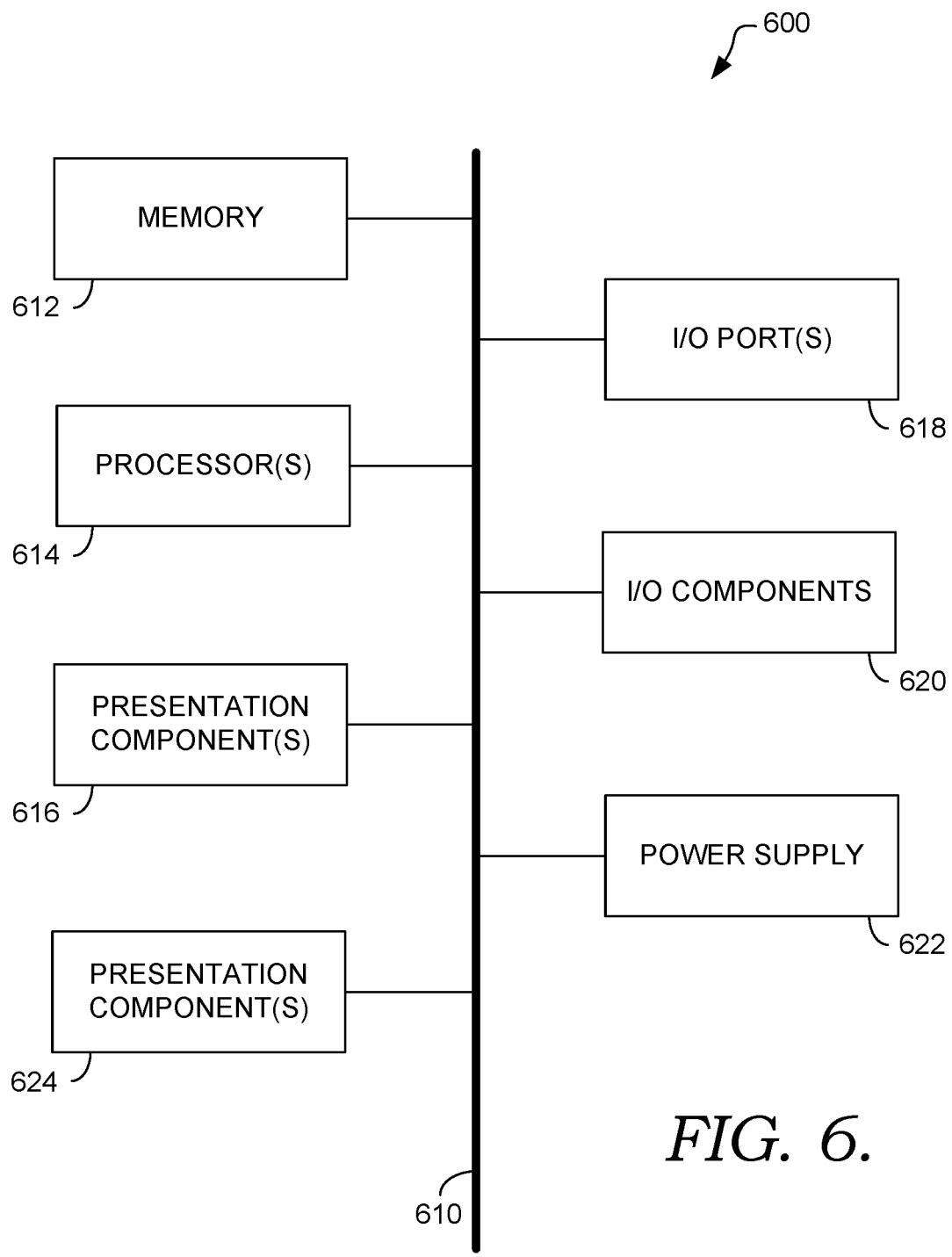
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, or more specialty computing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," or "handheld device," as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include for example solid-state memory, hard drives, and optical-disc drives. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, or a wireless device. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer system to generate an enhanced electronic communication for an improved computing experience, the system comprising:
   at least one processor; and
   computer memory having computer-readable instructions embodied thereon that when executed by the at least one processor perform operations comprising:
      detecting a set of mentions in an electronic communication, a first mention indicating a user associated with the electronic communication;
      programmatically determining a corresponding point of view ("POV") for the first mention;
      programmatically parsing the electronic communication into a set of sections;
      for a first section of the set of sections:
         determining the first mention is associated with the first section; and
         designating the user, indicated by the first mention, as an intended recipient of the first section;
      generating an enhanced electronic communication data used to generate a visual indicator within a user interface indicating the user as the intended recipient of the first section, the enhanced electronic communication data comprising the electronic communication and a data label corresponding to the first section, the data label indicating the user as the intended recipient of the first section and further indicating a first POV associated with the intended recipient corresponding to the first mention of the first section;
      generating a first suggested reply for the intended recipient responding to at least the first section based at least in part on the first POV associated with the intended recipient corresponding to the first mention of the first section; and
      storing the enhanced generating electronic communication data in an electronic record associated with the electronic communication.

2. The computer system of claim 1, wherein the determined corresponding POV is determined as a second-person POV ("POV2") or a third-person POV ("POV3").

3. The computer system of claim 2, wherein the visual indicator comprises a first indication associated with the first section of the electronic communication that indicates the POV corresponding to the first mention of the first section based on the data label corresponding to the first section.

4. The computer system of claim 3, wherein the first indication comprises a highlight, color, shading, label, boldface text, or visual marking.

5. The computer system of claim 2, wherein designating the at least one user, indicated by the first mention, as the intended recipient of the first section further comprises:
designating the intended recipient as the POV2 intended recipient if the POV corresponding to the first mention is determined as the POV2; and
designating the intended recipient as the POV3 intended recipient if the POV corresponding to the first mention is determined as the POV3.

6. The computer system of claim 5, wherein the POV2 intended recipient designation indicates the first section is directed to the at least one user, and wherein the POV3 intended recipient designation indicates the first section is relevant to the at least one user.

7. The computer system of claim 2, further comprising:
generating a determination that the POV corresponding to the first mention comprises the POV2.

8. The computer system of claim 2, further comprising:
if the data label corresponding to the first section indicates the POV2, then determining a responsible task to be performed by the first recipient based on the first section; and
if the data label corresponding to the first section indicates the POV3, then determining a relevant task that is associated with the first recipient based on the first section; and
providing an indication of the responsible task or an indication of the relevant task to a computer application for task tracking.

9. The computer system of claim 1:
wherein the first mention further indicates a second user associated with the electronic communication, and the second user is designated as the intended recipient of the first section; and
wherein at least one mention of the set of mentions comprises an implicit mention.

10. The computer system of claim 1:
wherein detecting the set of mentions in an electronic communication comprises:
if the electronic communication is an email, determining the set of mentions based at least in part on a recipient of the email, or
if the electronic communication is a meeting transcription, determining the set of mentions based on a meeting attendee; and
wherein an entity extraction model is used to detect the set of mentions.

11. The computer system of claim 1, wherein the first mention is determined to be associated with the first section based on a determination of at least one of the following conditions:
the first mention is within the first section;
the first section does not include the first mention and does not include a second mention, of the set of mentions, and the first section is closer to the first mention than the second mention; and
the first section does not include the first mention and does not include the second mention, the first section has a contextual similarity to a second section, and the first mention is within the second section.

12. The computer system of claim 1, further comprising storing as labeled training data, in a database configured for use to train a machine learning model, at least a portion of the enhanced electronic communication data.

13. A computer-implemented method to provide a personalized computing experience in a communications application that is a computer program operating on at least one computing device, the method comprising:
for an electronic communication having a message body and at least a first recipient, determining one or more mentions in the message body, each mention indicating at least one recipient of the electronic communication;
determining one or more sections of the message body;
for a first mention, of the one or more mentions:
determining that the first mention corresponds to a second-person point of view ("POV2") or a third-person point of view ("POV3") with respect to the first recipient; and
determining that a first section, of the one or more sections, is associated with the first mention;
generating, based on the first mention corresponding to the POV3, a suggested reply for the first recipient, responding to at least the first section; and
causing to present, via the communications application, a first indication associated with the first section, the first indication indicates a point of view (POV) associated with the first mention.

14. The method of claim 13, wherein the first mention corresponds to a POV2, and further comprising:
for a second mention, of the one or more mentions:
determining that the second mention corresponds to a POV3 with respect to the first recipient; and
determining at least a second section, of the one or more sections, that is associated with the second mention; and
causing to present, via the communications application, a third indication associated with the second section, the third indication being different than the first indication.

15. The method of claim 14, wherein the first indication comprises a first color, a first highlight, a first shading, or a first visual indication, and the third indication comprises a second color that is different than the first color, a second highlight that is different than the first highlight, a second shading that is different than the first shading, or a second visual indication that is different than the first visual indication.

16. The method of claim 13, further comprising:
determining at least one section, of the one or more sections, that is not associated with the first mention;
modifying the message body of the electronic communication to omit the at least one section that is not associated with the first mention, thereby forming a modified message body; and
causing the modified message body to be presented via the communications application.

17. The method of claim 13, wherein the first section is determined to be associated with the first mention based on at least one of the following determinations:
the first section includes the first mention;
the message body includes a second mention corresponding to a second recipient, the first section does not include the first mention or the second mention, and the first mention occurs, in the message body, closer to the first section than the occurrence of the second mention in the message body; and
the message body includes the second mention corresponding to the second recipient, the first section does not include the first mention or the second mention, the first section has a contextual similarity to a second section, of the one or more sections, and the second section includes the first mention.

18. The method of claim 13, wherein the first indication includes the suggested reply.

19. Computer storage media, excluding signals per se, having computer-executable instructions embodied thereon that when executed by at least one computer processor, cause operations to be performed comprising:
- receiving electronic communication data comprising a message body and metadata indicating one or more recipients of the electronic communication;
- determining one or more mentions in the message body, each mention referring to at least one recipient, of the one or more recipients of the electronic communication;
- for each mention, determining a corresponding point of view (POV) for the mention that comprises a second-person POV ("POV2") or a third-person POV ("POV3");
- parsing the message body into one or more sections comprising at least a first section;
- for the first section having at least one mention associated therewith:
  - determining a first mention, of the one or more mentions, that is associated with the first section; and
  - based on the POV corresponding to the first mention, determining a set of intended recipients of the first section comprising a first recipient referred to by the first mention; and
- generating, based on the POV corresponding the first mention corresponding to the POV3, a suggested reply for the first recipient, responding to at least the first section; and based on the set of intended recipients of the first section, providing an enhanced computing experience including the suggested reply.

20. The computer storage media of claim 19:
wherein the enhanced computing experience comprises at least one of:
- for a first intended recipient of the set of intended recipients, causing a presentation of the message body with a first visual indication if the POV corresponding to a mention that refers to the first intended recipient is the POV2, and causing the presentation of the message body with a second visual indication if the POV corresponding to the mention that refers to the first intended recipient is the POV3; and
- for the first intended recipient of the set of intended recipients, generating a first suggested reply for the first intended recipient, responding to at least the first section, if the POV corresponding to the mention that refers to the first intended recipient is the POV2, and generating a second suggested reply, for the first intended recipient, responding to at least the first section, if the POV corresponding to the mention that refers to the first intended recipient is the POV3, wherein the second suggested reply is different than the first suggested reply.

* * * * *